(12) United States Patent
Ji et al.

(10) Patent No.: US 11,668,412 B1
(45) Date of Patent: Jun. 6, 2023

(54) YOKE OVER PIPELINE END TERMINATION ASSEMBLY AND METHOD OF USE

(71) Applicant: FMC Technologies, Inc., Houston, TX (US)

(72) Inventors: Changan Ji, Houston, TX (US); Bryan Houston, Houston, TX (US); Sylvain Routeau, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 17/647,034

(22) Filed: Jan. 5, 2022

(51) Int. Cl.
| | |
|---|---|
| *F16L 1/235* | (2006.01) |
| *F16L 1/12* | (2006.01) |
| *F16L 1/26* | (2006.01) |
| *F16L 1/20* | (2006.01) |
| *F16L 1/18* | (2006.01) |

(52) U.S. Cl.
CPC ............ *F16L 1/123* (2013.01); *F16L 1/18* (2013.01); *F16L 1/20* (2013.01); *F16L 1/26* (2013.01)

(58) Field of Classification Search
CPC ..... F16L 1/123; F16L 1/20; F16L 1/18; F16L 1/26
See application file for complete search history.

(56) References Cited

U.S. PATENT DOCUMENTS

| 7,600,569 B2 | 10/2009 | Routeau et al. |
| 2014/0064855 A1 | 3/2014 | Hammer et al. |
| 2016/0169414 A1 | 6/2016 | Ayestaran Basagoitia et al. |
| 2020/0109797 A1* | 4/2020 | Conti ................ F16L 1/16 |
| 2021/0348703 A1* | 11/2021 | Vorley ............. F16L 19/0231 |

FOREIGN PATENT DOCUMENTS

WO     2021/213701 A1     10/2021

OTHER PUBLICATIONS

International Search Report issued in International Application No. PCT/US2023/010049, dated Apr. 4, 2023 (5 pages).
Written Opinion issued in International Application No. PCT/US2023/010049, dated Apr. 4, 2023 (8 pages).

* cited by examiner

*Primary Examiner* — Sean D Andrish
(74) *Attorney, Agent, or Firm* — Osha Bergman Watanabe & Burton LLP

(57) ABSTRACT

A system includes a foundation with a post mounted on the foundation top surface and a pipe module configured to couple to the foundation. The pipe module has a yoke to cooperate with the post to engage the pipe module with the foundation. The pipe module is connected to the end of a pipeline and is configured to slide along the foundation responsive to longitudinal and angular movements of the end of the pipeline.

A method includes deploying a foundation subsea and securing the foundation to a seafloor. The foundation has a post. The method includes deploying the pipe module via the pipeline suspended by a pipe module installation machine. The pipe module has a yoke. The method includes engaging the yoke with the post, paying out the pipeline to lower the yoke, and lowering and engaging the pipe module with the foundation.

17 Claims, 21 Drawing Sheets

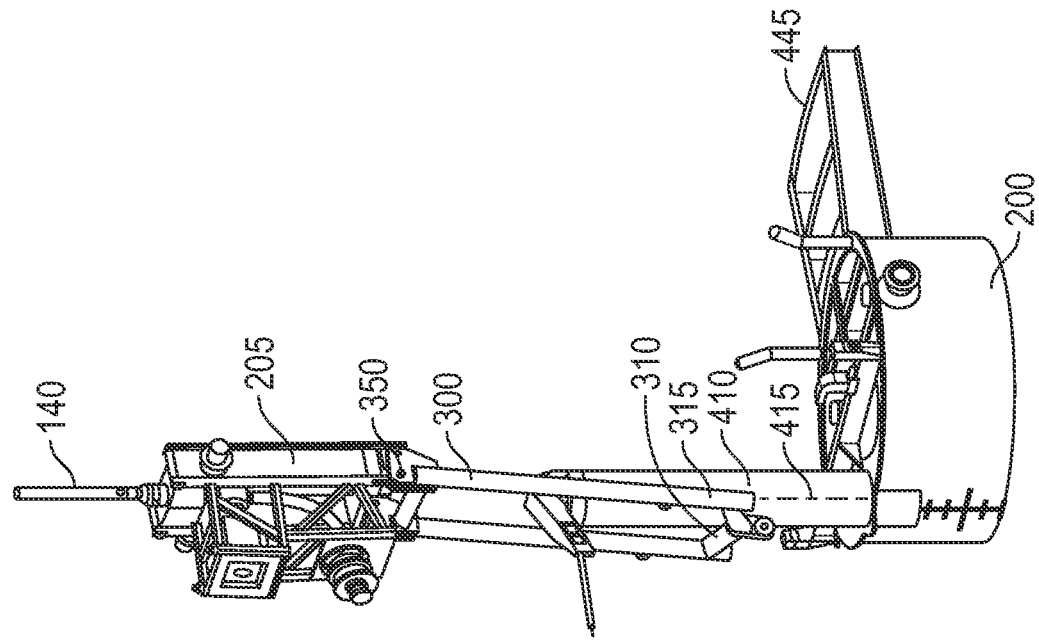
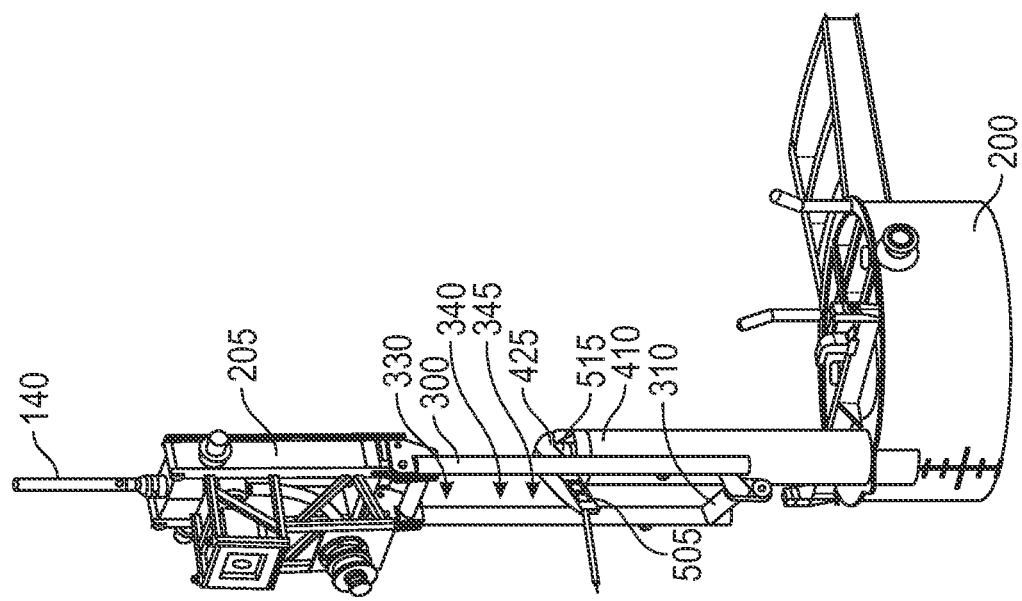

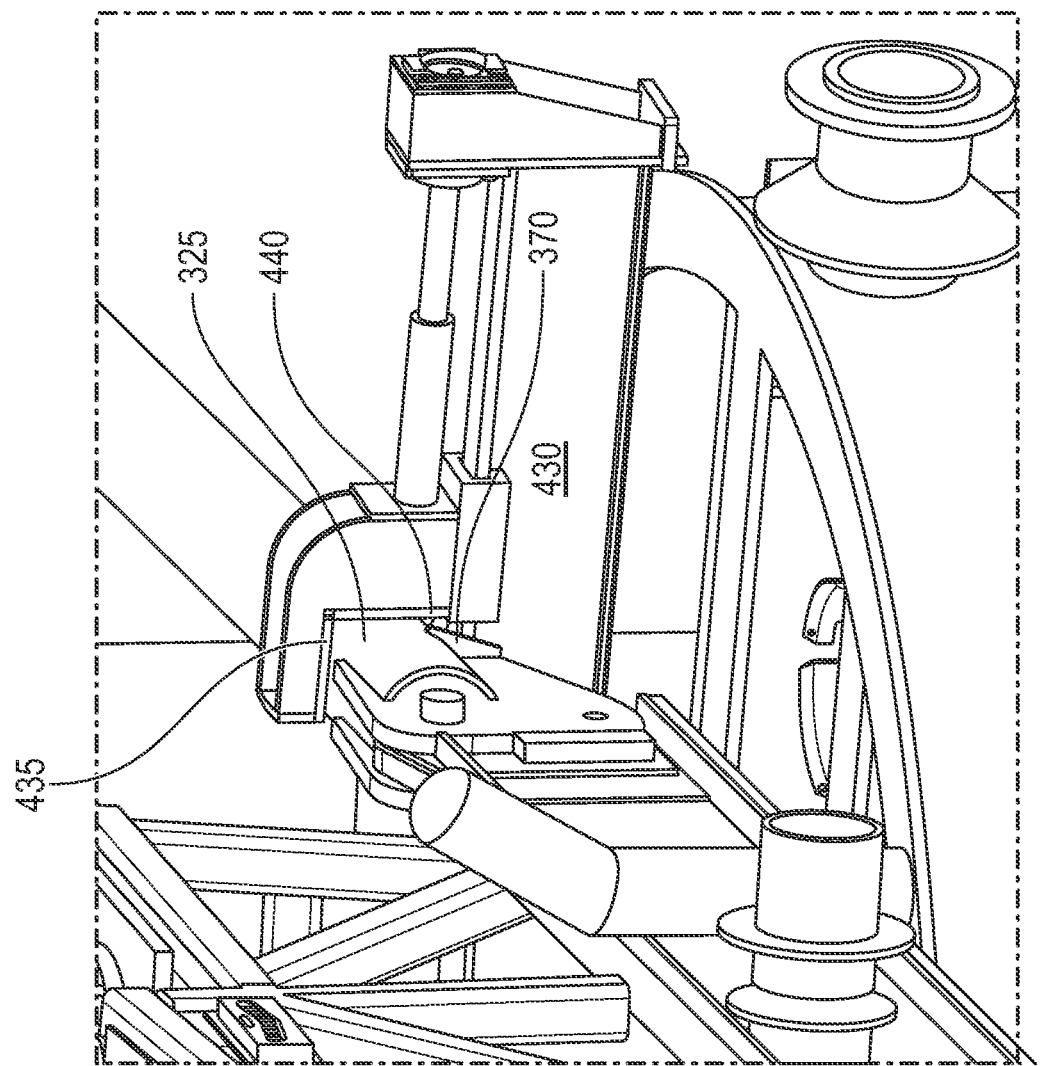

YOKE OVER PIPELINE END TERMINATION ASSEMBLY AND METHOD OF USE

BACKGROUND

Embodiments disclosed herein relate generally to subsea oil and gas production equipment. More particularly, embodiments disclosed herein relate to a pipeline end termination (PLET) assembly for use as an initiation of a subsea pipeline or flowline.

Subsea equipment may be used for many different applications. One particular application includes hydrocarbon (oil and gas) production (flow) from a subsea well, which involves extracting or removing hydrocarbon fluid from a formation below the surface of the seafloor. Production equipment is often connected to wellheads used to provide support for tubing and casing inserted into the wellbore and for supporting a production Christmas tree connected to the upper end of the wellhead housing. The Christmas tree may control the flow to production equipment disposed at a distance from the wellhead, such as a flowline hub or manifold. The production continues through other production equipment such as a flowline (within the oilfield) and a pipeline (outside of the oilfield.) Installation of pipelines may utilize PLET assemblies.

Initiation of pipelines on the seabed requires reaction points of adequate strength to secure an end portion of a pipeline segment of a pipeline. Many pipelines also require holdback points in the system to withstand substantial pipeline loads arising during life service such as thermal expansion and contraction loads and walking loads. Conventional PLETs accommodate pipeline initiation and holdback force using an anchor pile inserted in the seabed. The conventional PLET is typically linked to the anchor pile using a chain. The anchor pile is preinstalled using an installation machine such as an ocean-going ship (multipurpose vessel) that is typically smaller and less capable than the conventional PLET installation machine (pipelay vessel.) The chain-anchor pile arrangement accommodates pipeline heading variations. The system requires space on the seabed for both the anchor pile and the conventional PLET. Conventional PLETs have an integrated mudmat foundation, which supports the pipe module on the seabed. The mudmat type of foundation usually has limited load capacity, especially lateral load capacity. Alternative PLETs such as a Latch and Hinge Over (L&HO) and a Stab and Hinge Over (S&HO) combine the anchor pile with the pipe module to provide load capacity to accommodate thermal expansion and contraction loads and walking loads. Installation techniques for the L&HO and S&HO systems require a smaller range of weather-related heave motion conditions. L&HO and S&HO are less weather-tolerant and more weather sensitive.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for securing an end portion of a pipeline segment of a pipeline, including a foundation having a foundation top surface and a foundation bottom surface, and a post mounted on the foundation top surface, a pipe module configured to couple to the foundation, the pipe module having a bottom surface and a pipe module longitudinal stop, a yoke mounted to the pipe module, the yoke cooperating with the post to engage the pipe module with the foundation; and an extension mounted to the foundation and extending radially from the foundation, the pipe module being connected to the end portion of the pipeline segment of the pipeline and configured to slide along the extension responsive to longitudinal and angular movements of the pipeline segment of the pipeline.

In another aspect, embodiments disclosed herein relate to a method for securing an end portion of a pipeline segment of a pipeline, the method including deploying a foundation subsea and securing the foundation to a seafloor, the foundation having a post, deploying a pipe module via the pipeline suspended by a pipe module installation machine, the pipe module comprising a yoke, engaging the yoke with the post, paying out the pipeline to lower a first transverse crossbeam of the yoke, and lowering and engaging the pipe module with the foundation.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIGS. 7A-7H show the pipe module of FIG. 3 in stages of the pipe module being lowered into position and engaging the foundation of FIG. 4 for securing the end portion of the pipeline segment of the pipeline to initiate laying the pipeline in accordance with embodiments disclosed herein.

FIGS. 8A and 8B show a yoke support of the system for securing the end portion of the pipeline segment of the pipeline of FIG. 2 in accordance with embodiments disclosed herein.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein generally relate to a yoke-over PLET and methods of installation. The yoke-over PLET includes a foundation and a pipe module. Embodiments disclosed herein also generally relate to methods and systems for installing the foundation and the pipe module. Systems and methods in accordance with embodiments disclosed herein may improve weather tolerance of the installation of the pipe module, maintain accommodation for heading variations of a pipe module installation machine, such as a pipelay vessel, provide pre-installation of the foundation with a smaller vessel, and reduce space on a seabed as compared to conventional systems.

In one or more embodiments, the foundation of the present application may be anchored to the seabed by attachment to a suction pile to form a foundation-suction pile assembly before being deployed to the seabed. The foundation may include a post extending from a top surface of the foundation. The post facilitates engaging the pipe module with the foundation. Further, the post may provide a reaction point for initiation loads during pipe module and pipeline installation, and provide a reaction point against pipeline thermal expansion and/or contraction loads, walking loads, and/or steel catenary riser tension loads in operation. The pipe module has a yoke disposed on one end of the pipe module. The yoke cooperates with the post on the foundation to engage the pipe module with the foundation. The pipe module is configured to connect with an end portion of a pipeline segment. The foundation may include an extension extending horizontally from the foundation along which the pipe module is configured to slide in response to longitudinal and angular movements of the pipeline segment.

Figure 1:
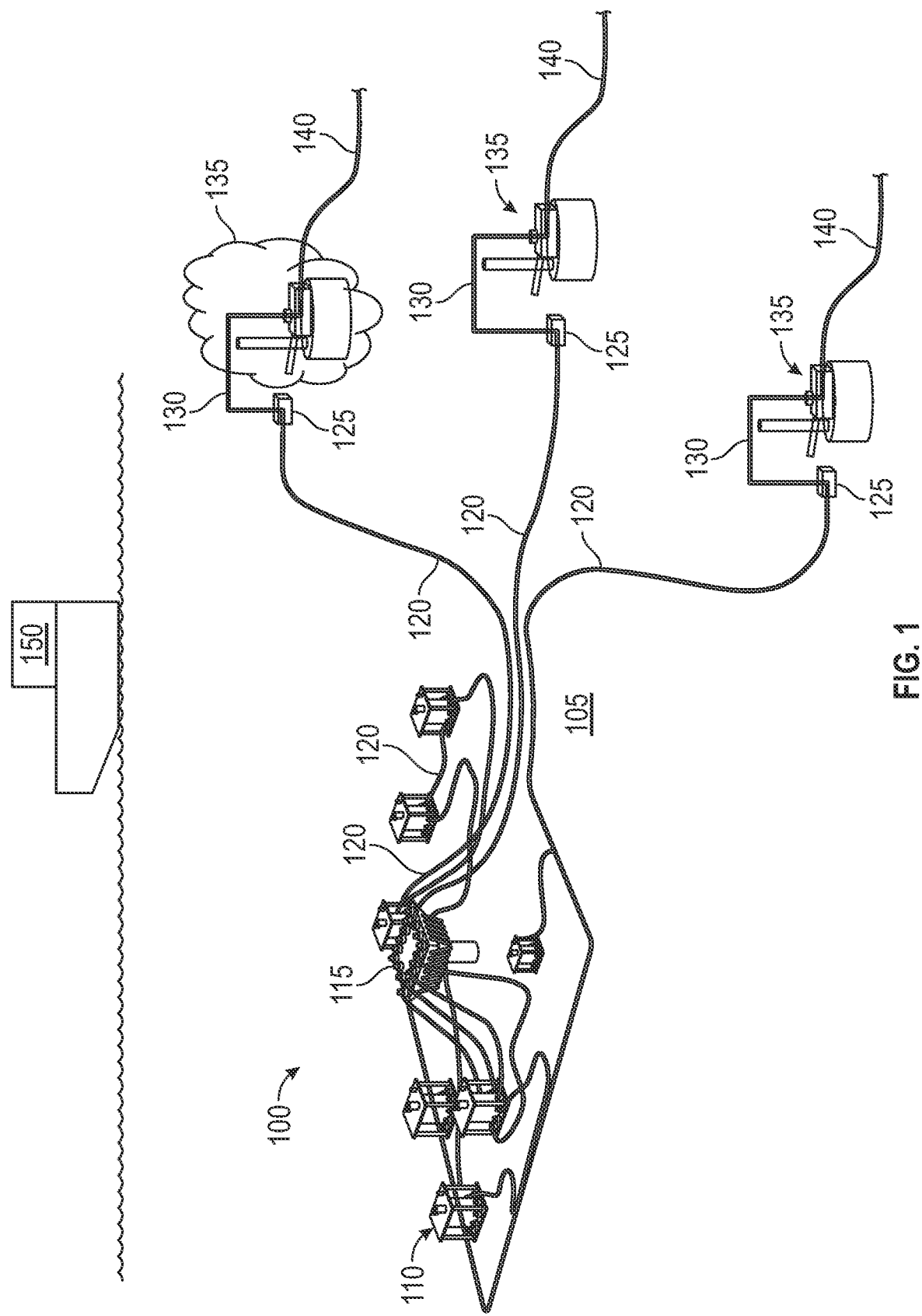
FIG. 1 shows a system for securing an end portion of a pipeline segment of a pipeline in a subsea field in accordance with embodiments of the present disclosure.

FIG. 1 illustrates an exemplary subsea field (100) located on the seabed (105), the subsea field (100) including a system for securing an end portion of a pipeline segment of a pipeline in the subsea field in accordance with embodiments of the present disclosure. In general, subsea field layouts may be configured in a myriad of ways. Subsea field (100) is not intended to be limited with respect to the particular configuration of the pipeline equipment shown. Production from a subterranean reservoir flows to the production equipment on the seafloor through a subsea Christmas tree (110). The subsea Christmas tree (or tree) (110) includes a plurality of valves and fittings for controlling the flow of fluid into or out of the well.

The tree (110) may be mounted to a top of a wellhead of a well. The tree (110) receives a fluid from the well and the fluid travels through the valves in the tree (110), and the fluid may exit the tree (110) to infield flowlines (120) and then to the flowline hub or manifold (115) and then again to the flowline (120). The flowline (120) leads to a flowline end termination (FLET) (125), then through a jumper (130), and then to the yoke-over PLET (135) in accordance with embodiments of the present disclosure. A pipeline (140) from the yoke-over PLET (135) leads to a destination remote from the subsea field (100) such as any type of fixed or floating production platform, subsea field, rig, vessel, or any type of facility known in the art.

Figure 2:
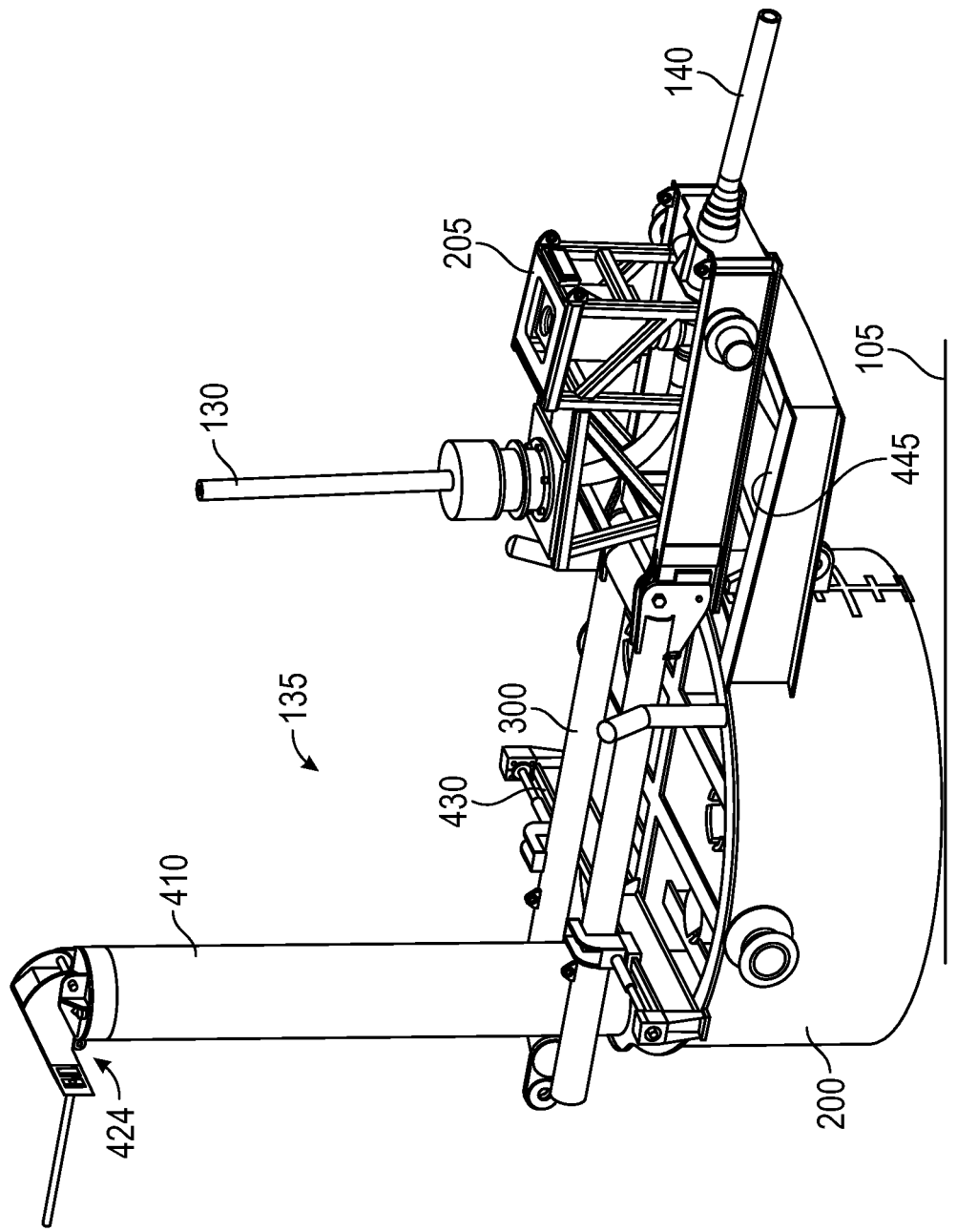
FIG. 2 shows a foundation and a pipe module of a system for securing an end portion of the pipeline segment of the pipeline in accordance with embodiments of the present disclosure.

FIG. 2 shows an isometric view of the yoke-over PLET (135) in accordance with one or more embodiment. The yoke-over PLET (135) includes the pipe module (205) and the foundation (200). The pipe module (205) is shown engaged with the foundation (200). The jumper (130) from FIG. 1 is shown mated to the pipe module (205). In accordance with one or more embodiments, the pipe module includes a yoke (300) further described with respect FIG. 3, and the foundation (200) includes a post (410) with which the yoke (300) engages, as further described with respect FIG. 4. The post (410) may include a heave stopper assembly (424) further described with respect to FIG. 4. The foundation (200) may also include a yoke support (430) for engaging and supporting the yoke (300) and an extension (445) for engaging and supporting the pipe module (205), as further described with respect to FIG. 4.

Figure 3:
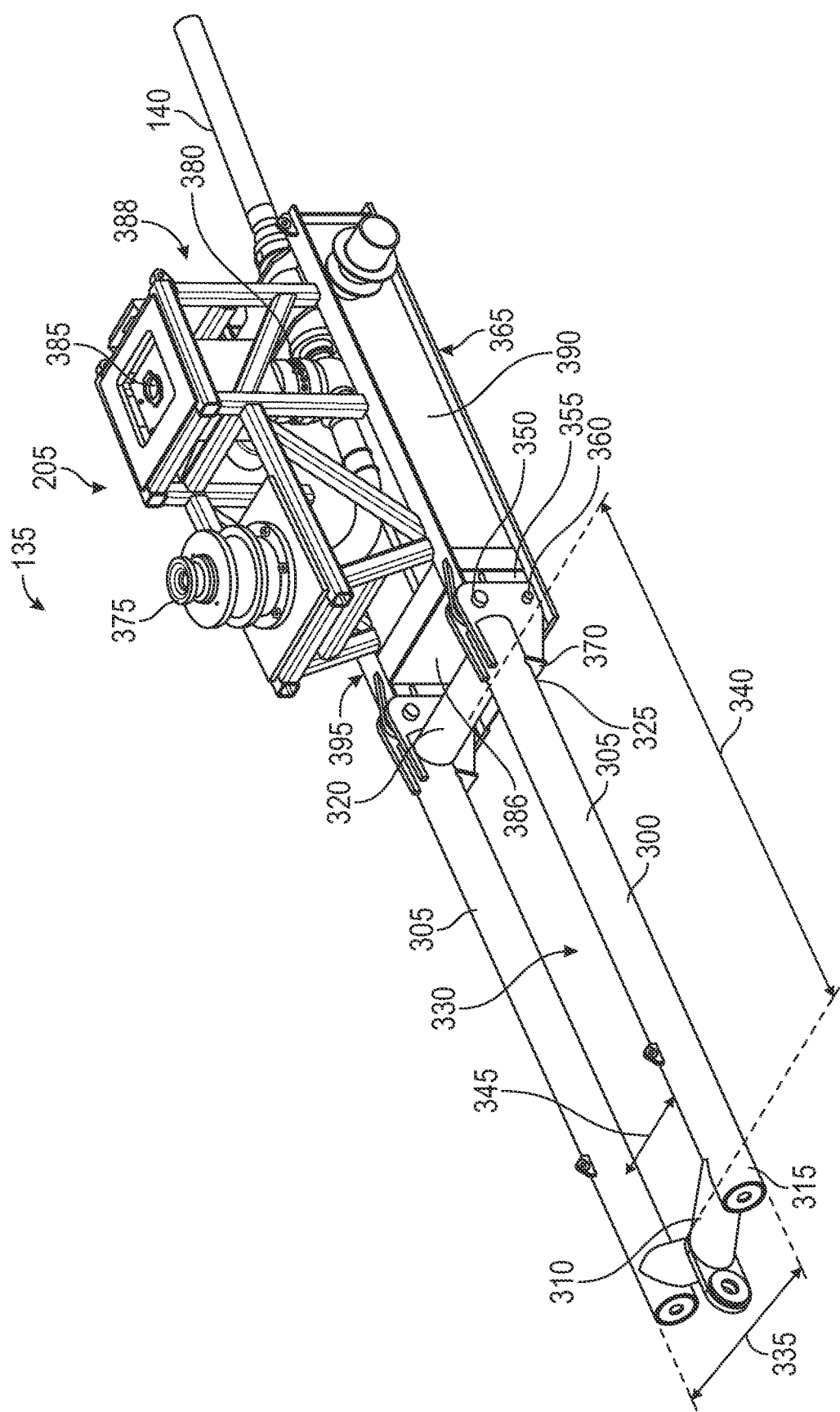
FIG. 3 shows the pipe module of the system for securing the end portion of the pipeline segment of the pipeline of FIG. 2 in accordance with embodiments of the present disclosure.

FIG. 3 shows that the pipe module (205) of the PLET (135 FIG. 2) is configured to secure an end portion of the pipeline segment of the pipeline (140). The pipe module (205) includes a first end (386), a second end (388), a first side (390), a second side (395), a module bottom surface (365), and the yoke (300). Although pipe module (205) is described and shown as a rectangular structure, one of ordinary skill in the art will appreciate that the pipe module (205) may be of any shape without departing from the scope of embodiments disclosed herein. The yoke (300) is connected to the first end (386) of the pipe module (205). The yoke (300) includes two longitudinal members (305), a first transverse crossbeam (310) connected between the two longitudinal members (305) at a yoke first end (315), and a second transverse crossbeam (320) connected between the two longitudinal members (305) at a yoke second end (325). The two longitudinal members (305), the first transverse crossbeam (310), and the second transverse crossbeam (320) define a yoke opening (330) and a yoke outer width (335). The yoke (300) is configured to engage with the post (410) of the foundation (200), shown in FIG. 2, such that the post (410) is inserted into the yoke opening (330) as the pipe module (205) is lowered to engage and orient the pipe module (205) with the foundation (200).

The yoke opening (330) has a yoke opening length (340) and a yoke opening width (345). The yoke second end (325) is mounted on the pipe module (205). In accordance with one or more embodiments, the yoke (300) is connected to the pipe module (205) with a yoke hinge (350) on the first end (386) of the pipe module (205). A range of rotation of the yoke hinge (350) may be any angular range such as 0 to 15° (deg), 0 to 30°, 30 to 90°, 90 to 180°, 0 to 360°, and combinations thereof. In the embodiment shown, the yoke hinge (350) range of rotation is 0 to 90°. The yoke hinge (350) may be made out of any durable material known in the art, such as steel.

In one or more embodiments the pipe module includes a yoke downward rotation stopper (355) and a yoke rotation lock mechanism, such as a yoke rotation locking pin (360). The yoke downward rotation stopper (355) limits downward rotation of the yoke (300) with respect to the pipe module (205). The yoke rotation locking pin (360) is used to lock the yoke (300) in a particular position or to prevent or limit the yoke (300) from rotating with respect to the pipe module (205). The yoke rotation lock mechanism (e.g., the yoke rotation locking pin (360)) may help secure the yoke (300) in a locked positioned during pipe module (205) lifting and handling to prevent damage to the pipe module (205) or surrounding equipment. The yoke rotation lock pin (360) may be removed before subsea deployment to allow the yoke (300) to freely rotate during subsea installation. The pipe module (205) may also include a jumper connector hub (375) and a valve or a plurality of valves (380). The valve or valves (380) may be configured to be operated by a remotely operated vehicle (ROV). FIG. 3 shows an American Petroleum Institute (API) specification 17D torque receptacle (385) for use with the ROV.

In accordance with one or more embodiments, the yoke downward rotation stopper (355) is connected to the pipe module (205) and may be configured to engage a surface of the yoke (300) when the yoke (300) rotates about the yoke hinge (350) a predetermined degree. In one embodiment, the yoke downward rotation stopper (355) is welded to the pipe module (205). The yoke downward rotation stopper (355) prevents the yoke from rotating past the yoke downward rotation stopper (355). The yoke downward rotation stopper (355) may be made out of any durable material known in the art, such as steel. The pipe module (205) may also include a pipe module longitudinal stop (370) configured to contact the yoke support (430) of the foundation (200) described further below with respect to FIGS. 4A, 8A, and 8B.

In accordance with one or more embodiments, the yoke rotation locking pin (360) is configured to be inserted into a hole formed in the first end (386) of the pipe module (205) and into a corresponding hole formed in the yoke second end (325) near the yoke hinge (350) to couple the yoke (300) to the pipe module (205). The yoke rotation locking pin (360) prevents rotation of the yoke (300) with respect to the pipe module (205). The yoke rotation locking pin (360) may be made out of any durable material known in the art, such as steel. The yoke rotation locking pin (360) may have any suitable shape, for example solid round stock, pipe, tube, square tube, solid square stock, and combinations thereof such that it may engage with the opening in the yoke and with the opening in the pipe module having the same or similar shape.

Figure 4A:
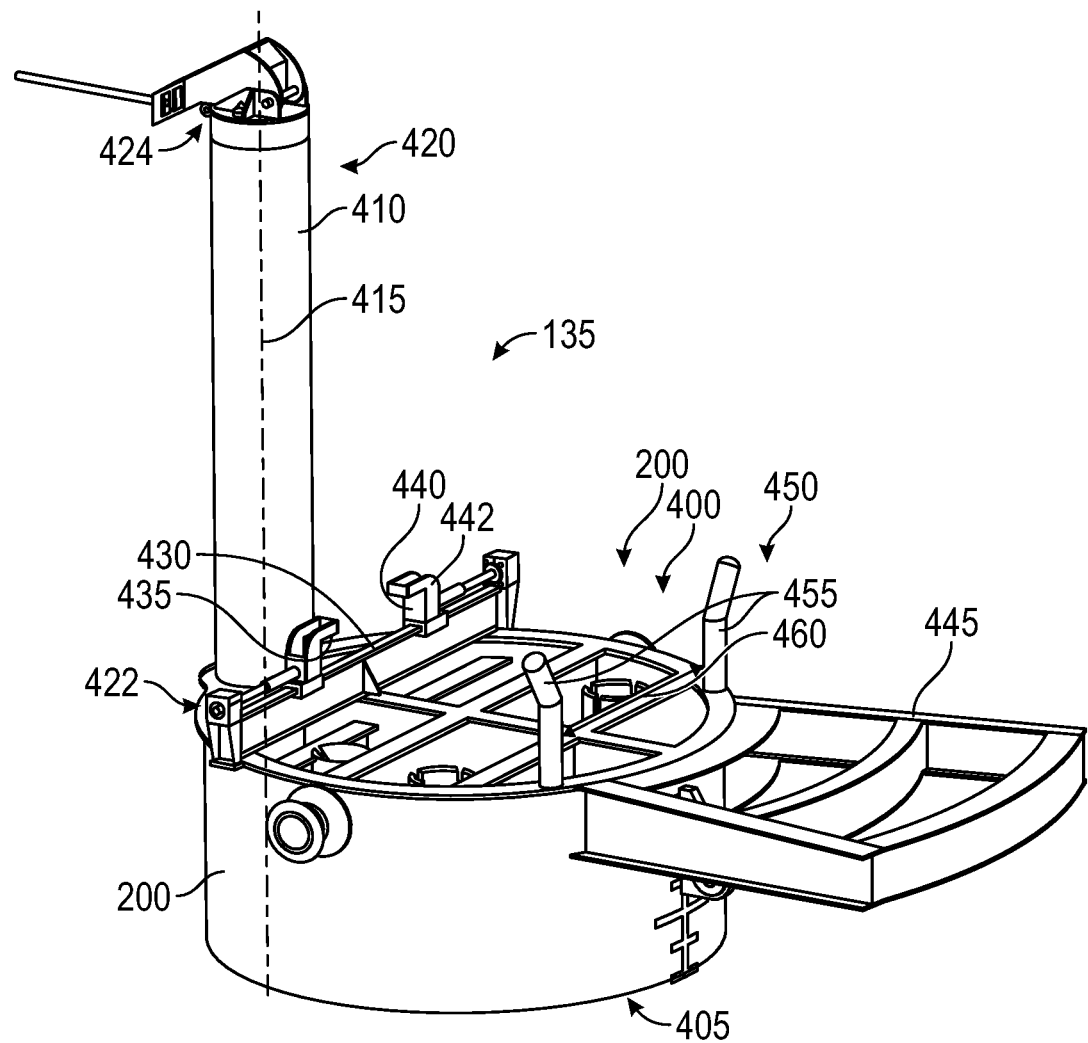
FIG. 4A shows the foundation of the system for securing the end portion of the pipeline segment of the pipeline of FIG. 2 in accordance with embodiments of the present disclosure.

Referring now to FIG. 4A, the foundation (200) of the PLET (135 FIG. 2) is shown having a foundation top surface (400) and a foundation bottom surface (405). An anchor such as a suction pile is shown in the exemplary embodiment and may connect to the foundation bottom surface (405). The entire length of the foundation (200) is not shown for simplicity. The foundation (200) extends down longer than shown. The foundation further includes the post (410) having a post longitudinal centerline, such as a post longitudinal axis (415), a post top end (420), and a post bottom end (422), wherein the post bottom end (422) is connected to the foundation top surface (400). In accordance with one or more embodiments, the post (410) may be formed from any suitable shape, for example pipe, tube, square tube, solid round stock, solid square stock, I-beam, and combinations thereof. In the exemplary embodiment shown, the post is cylindrical. The post further includes the heave stopper assembly (424) connected to the post top end (420).

Figure 8A:
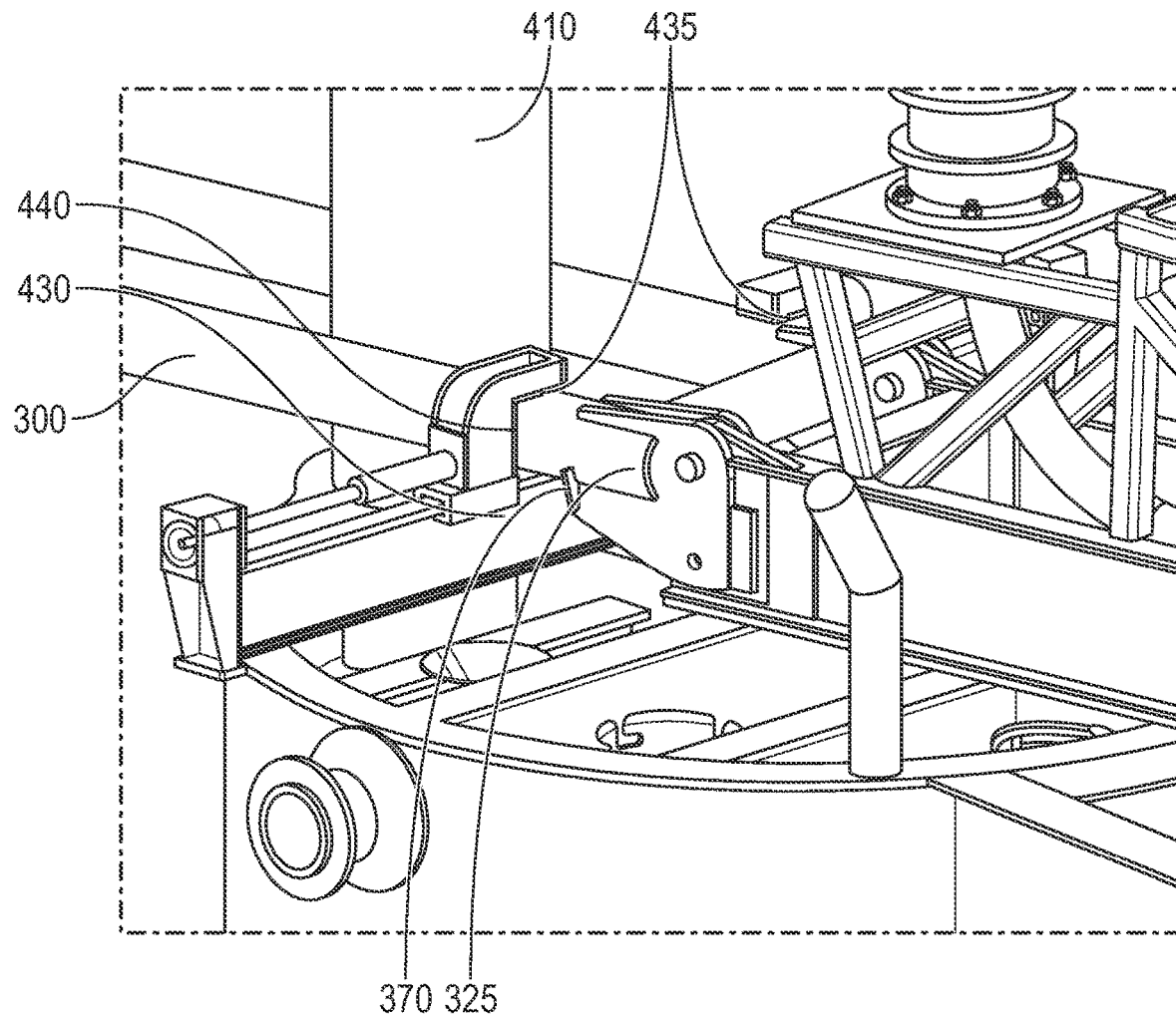

Still referring to FIG. 4A, the foundation (200) may further include the yoke support (430) that may include an uplift restraint (435) and a lateral restraint (440). The uplift restraint (435) and the lateral restraint (440) are configured to engage the yoke (300, FIG. 3) two longitudinal members (305, FIG. 3) to secure the yoke (300, FIG. 3) to the foundation (200). The uplift restraint (435) is configured to limit upward movement of the yoke (300, FIG. 3) from the foundation, while the lateral restraint (440) is configured to limit lateral movement of the yoke (300, FIG. 3) with respect to the foundation (200). As shown in FIG. 4A, in accordance with one or more embodiments, the uplift restraint (435) and the lateral restraint (440) may be formed as a single piece. For example, the uplift restraint (435) and the lateral restraint (440) may be formed as a bracket (442), such as an L-shaped bracket. Further, the foundation may include two opposing brackets (442), each bracket having an uplift restraint (435) and a lateral restraint (440). As shown, the pair of opposing brackets (442) extend upwardly and inwardly from the yoke support (430) and are configured to engage a side surface and an upper surface of each of the two longitudinal members (305, FIG. 3) of the yoke (300, FIG. 3). The uplift restraint (435) engages the pipe module (205) by securing the two longitudinal members (305) of yoke (300) and restrains the pipe module (205) from upward movement. The lateral restraint (440) engages the pipe module (205) through the two longitudinal members (305) of yoke (300) and restrains the pipe module (205) from lateral movement. In accordance with one or more embodiments, the lateral restraint (440) may be adjustable and lockable. For example, the brackets (442) may be movably coupled to the yoke support (430) such that the brackets (442) may be moved toward and away from each other to adjust a width of the opening between the opposing brackets (442) and, therefore, between the uplift restraints (435) and the lateral restraints (440). Adjusting the width of the opening between the opposing brackets (442) accommodates a range of landing angles of the pipe module (205) and the yoke (300 FIG. 3) and also allows yokes (300, FIG. 3) of different sizes to be received within the opposing brackets (442) and secured within the opposing brackets (442) by adjusting the width of the opening between the brackets (442). The brackets (442), and specifically, the lateral restraint (440) may be adjustable for example by being able to slide along the yoke support (430), or by screwing the lateral restraints (440) into position by jack screws or hydraulic cylinders, or a combination thereof. In accordance with one or more embodiments, the lateral restraint (440) may be adjusted by the ROV. The yoke support (430) may be configured to contact the pipe module longitudinal stop (370, FIG. 3). The pipe module longitudinal stop (370) may be disposed on the yoke second end (325), as shown in FIG. 3. Refer to FIGS. 8A and 8B for a more detailed view.

Still referring to FIG. 4A, in accordance with one or more embodiments, the foundation (200) may further include the extension (445). The extension may support the pipe module (205, FIG. 3) at the pipe module bottom surface (365, FIG. 3). The extension (445) extends horizontally from the foundation (200), for example, from the foundation top surface (400). The foundation (200) may further include a landing guide (450). The landing guide (450) includes at least one landing guidepost (455) disposed on the foundation top surface (400) and configured to help guide the pipe module (205) into position on the foundation (200). In the embodiment shown, two landing guideposts (455) are disposed on the foundation top surface (400) perpendicular to the foundation top surface (400). A distance between the opposing sides of each of the landing guideposts (455) defines a landing guide width (460), as described in further detail below with respect to FIG. 4B. The landing guideposts (455) may be any suitable shape, for example pipe, tube, square tube, solid round stock, solid square stock, I-beam, and combinations thereof. In the exemplary embodiment shown, the landing guideposts (455) are cylindrical. The landing guideposts (455) are shown with a bend along a length of each of the landing guideposts (455) to facilitate engaging the pipe module (205, FIG. 3), but the landing guideposts (455) may be configured straight or in other suitable shapes to help guide and position the pipe module (205, FIG. 3) on the foundation (200).

Figure 4B:
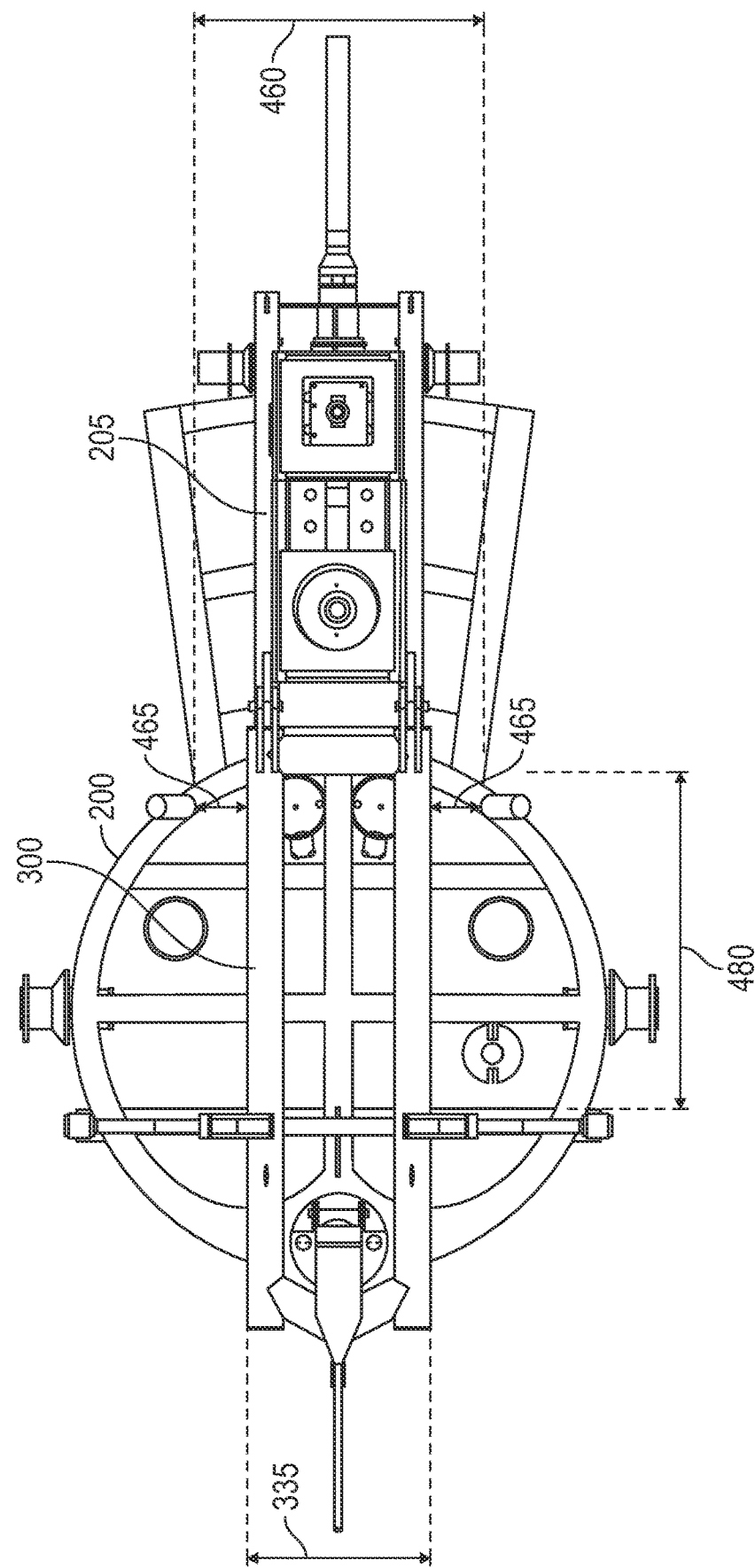
FIG. 4B and FIG. 4C show plan views of the foundation and the pipe module.
Figure 4C:
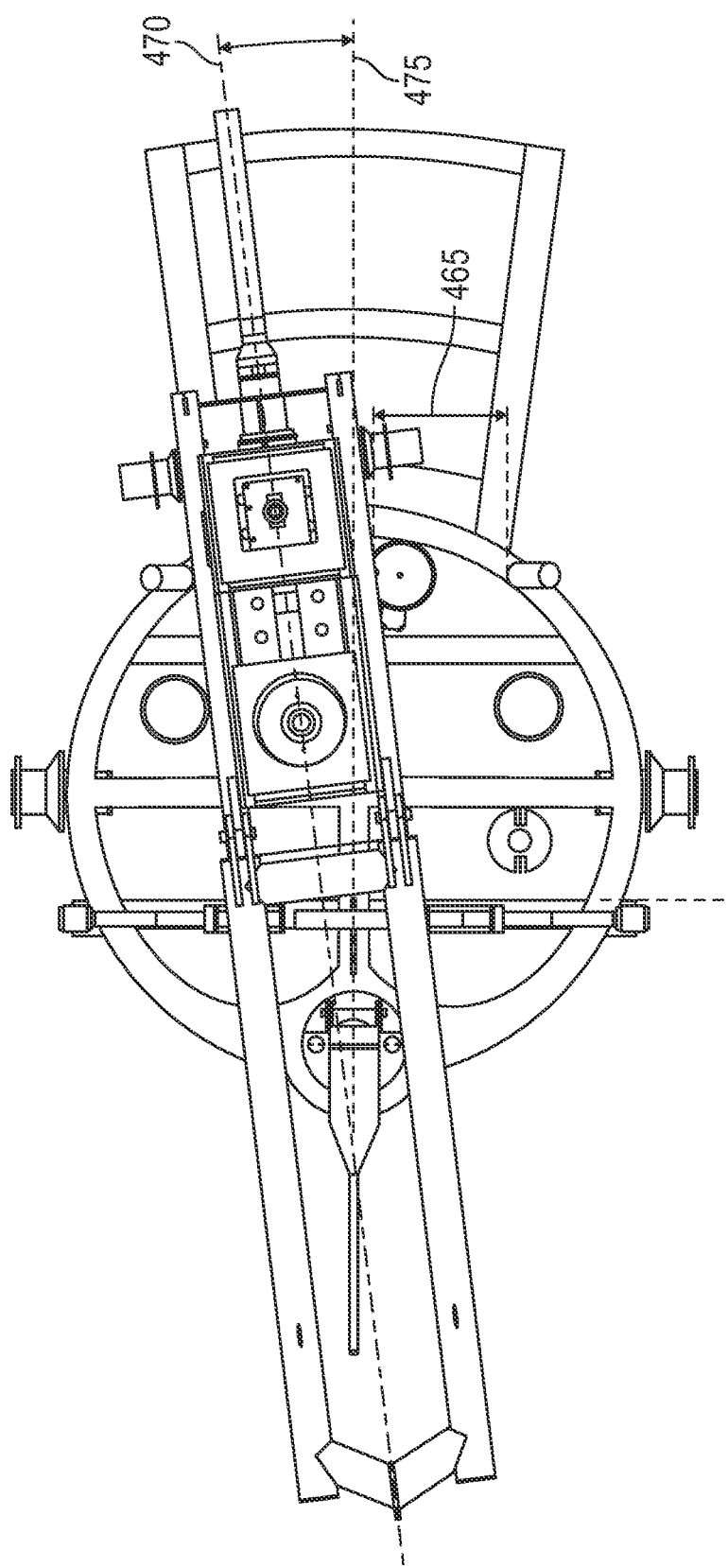

FIG. 4B shows a plan view of the pipe module (205) engaged with the foundation (200). In one embodiment, the pipe module (205) may slide a sliding distance (480) as defined by the yoke opening length (340 FIG. 3), the diameter of the post (410), and the position of the contact between the yoke support (430) and the pipe module longitudinal stop (370 FIG. 3) at the yoke second end (325 FIG. 3). In some embodiments, the sliding distance (480) may be approximately 2 m, approximately 3 m, or approximately 4 m. In the embodiment shown, the sliding distance is 3.1 m. A person of ordinary skill in the art will appreciate that a sliding distance of the pipe module (205) may vary depending on, for example, the application of the yoke-over PLET (135, FIG. 2), the dimensions of the foundation (200), the dimensions of the yoke (300), and the dimensions of the pipe module (205). The landing guide width (460) is greater than the yoke outer width (335), providing a gap (465) between the landing guideposts (455) and the yoke outer width (335) so that the yoke (300) may engage with the landing guide (450) and so that the pipe module (205) may be guided into position on the foundation (200) as the yoke (300) engages with the post (410) of the foundation (200). FIG. 4C shows that the gap (465) allows for a heading tolerance of +/−7.5° (degrees) between a pipe module heading (470) and a foundation heading (475) when the pipe module (205) contacts either of the landing guideposts (455). A person of ordinary skill in the art will appreciate that a heading tolerance may be varied by adjusting the landing guide width (460) and/or the dimensions of the yoke (300), and/or the dimensions of the post (410).

Figure 5A:
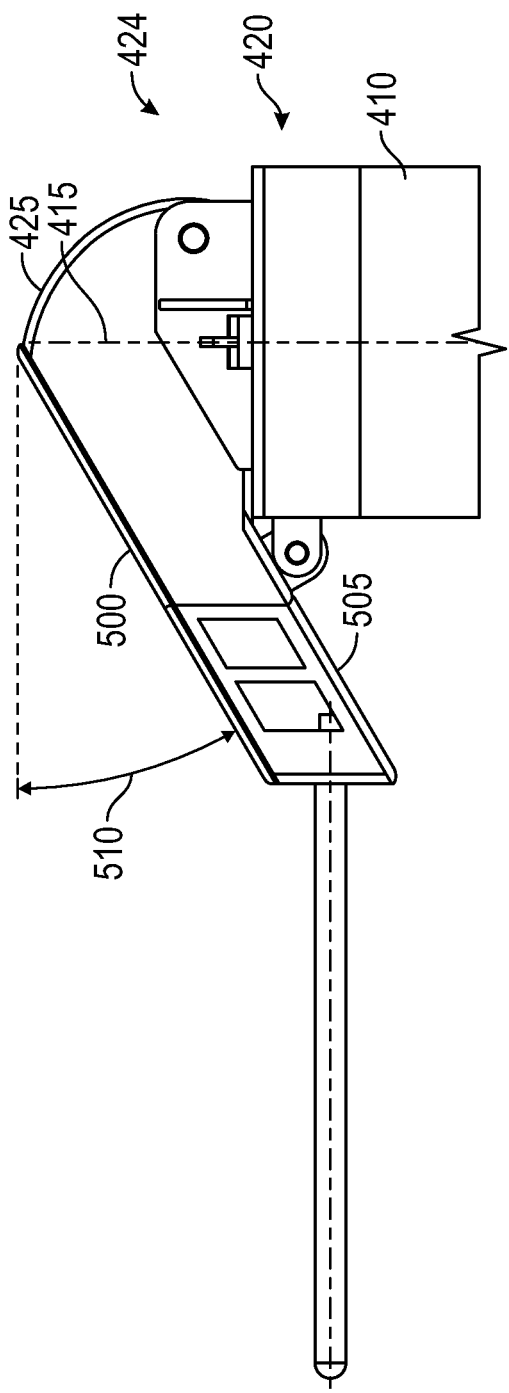
FIGS. 5A-5D show a heave stopper of the system for guiding and securing the end portion of the pipeline segment of the pipeline of FIG. 2 in accordance with embodiments of the present disclosure.
Figure 5B:
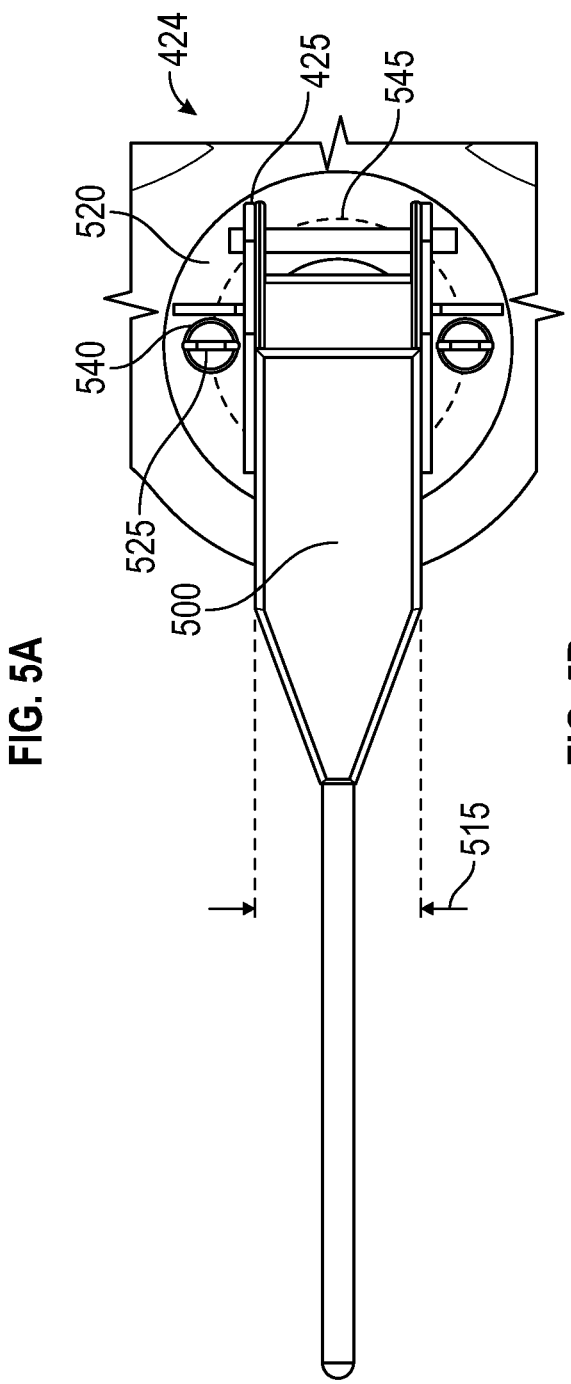

FIGS. 5A through 5E show details of the heave stopper assembly (424) connected to the post top end (420). The heave stopper assembly (424) may include a heave stopper (425) and/or a rotatable head (520). FIGS. 5A and 5B show the heave stopper (425) has a heave stopper top end (500) with a heave stopper top end angle (510) with respect to the post longitudinal axis (415), a heave stopper bottom end (505), and a heave stopper width (515). The heave stopper (425) is configured to align with the yoke (300, FIG. 3) of the pipe module (205) and may facilitate engagement of the yoke (300, FIG. 3) with the post (410) of the foundation (200, FIG. 4A). The heave stopper (425) is initially in a locked position, in which movement of the yoke (300, FIG. 3) in an upward direction may be limited by the heave stopper (425) when the yoke (300, FIG. 3) engages with the heave stopper bottom end (505). However, to accommodate large upheave impact loads, the heave stopper is configured to pivot about an axis to allow the yoke (300, FIG. 3), and therefore the pipe module (205) to be released from the foundation (200) to prevent damage to the foundation (200), the pipe module (205), and/or the pipeline (140).

Figure 5C:
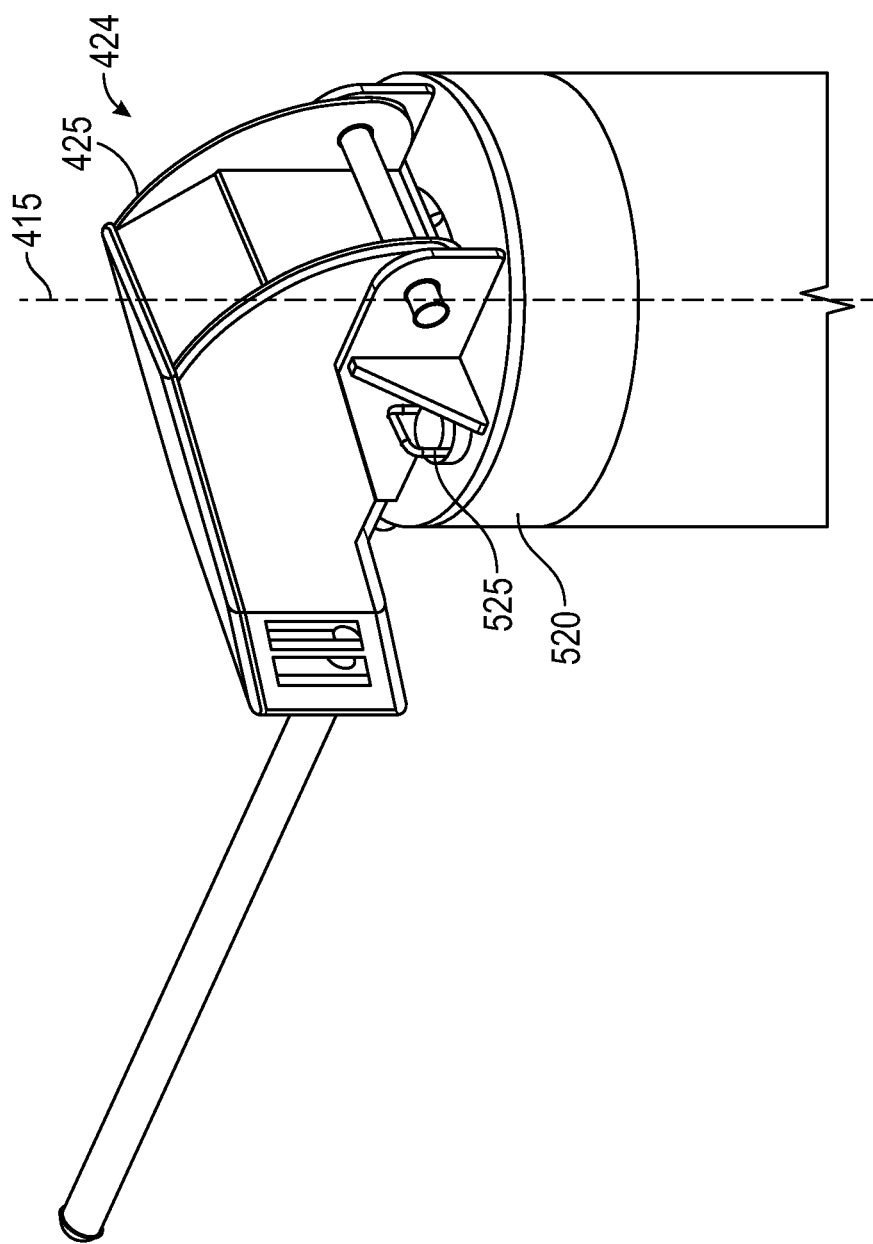

FIGS. 5B and 5C show a plan view and an isometric view of the heave stopper (425). In accordance with one or more embodiments, the heave stopper (425) may include a rotatable head (520) that is rotatable about the post longitudinal axis (415) so that an orientation of the heave stopper (425) may be adjusted subsea to accommodate various pipeline initiation directions. The rotatable head (520) may further include a rotation locking mechanism, such as a head rotation locking pin (525), to stop or limit rotation of the rotatable head. The rotatable head (520) locking pin (525) may be configured to provide an additional +/−2.5 degrees of rotation of the rotatable head (520) when in the locked condition. The rotatable head (520) has one or more lock pin holes (540). The axis of the lock pin holes (540) may be perpendicular to the top surface of the rotatable head (520). The centerlines of each of the lock pin holes (540) are arranged on a lock pin hole center circle (545). The centerline of the lock pin hole center circle (545) may be coaxial with the rotatable head (520) center of the rotatable head top surface.

Figure 5D:
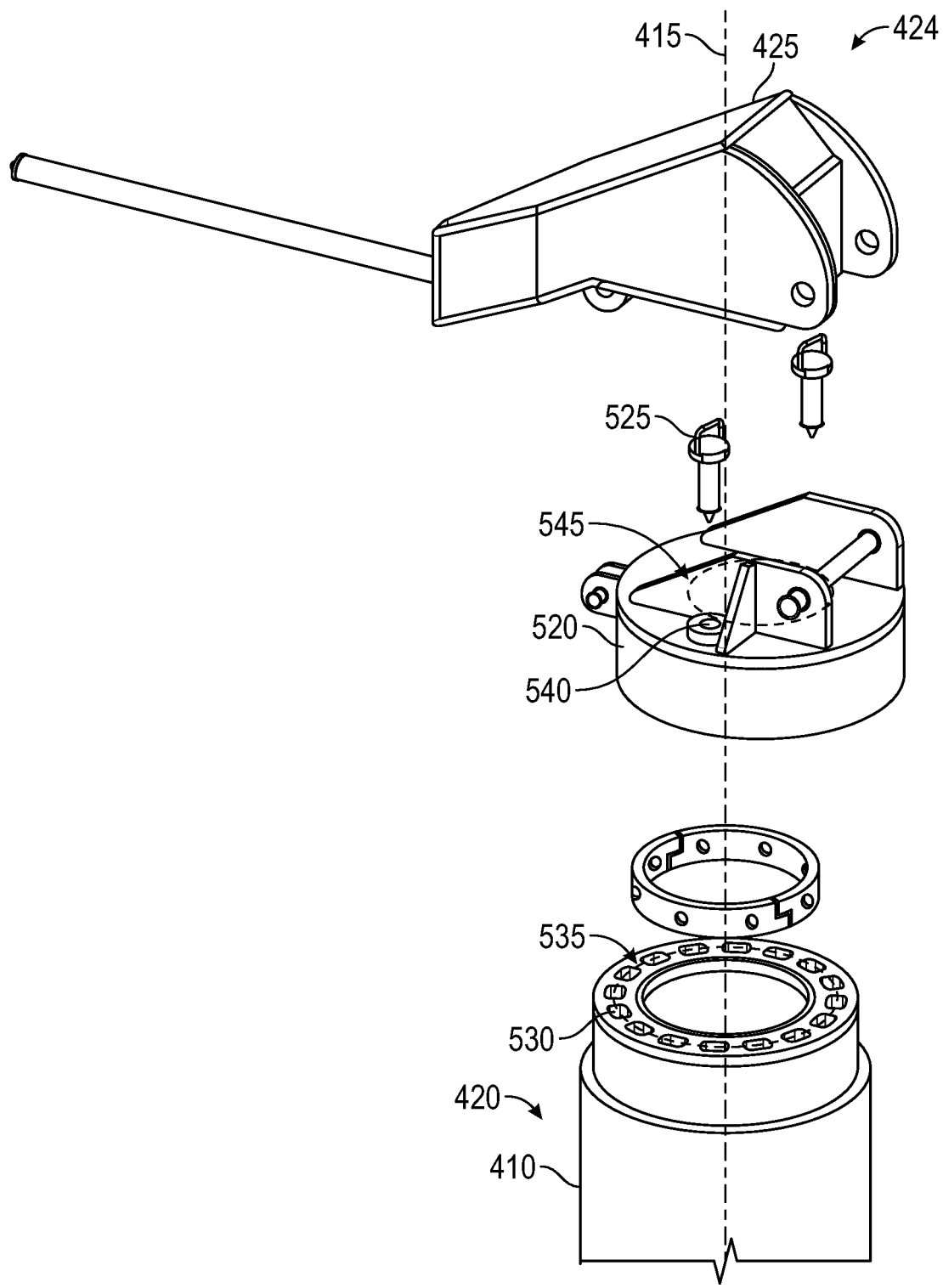
Figure 5E:
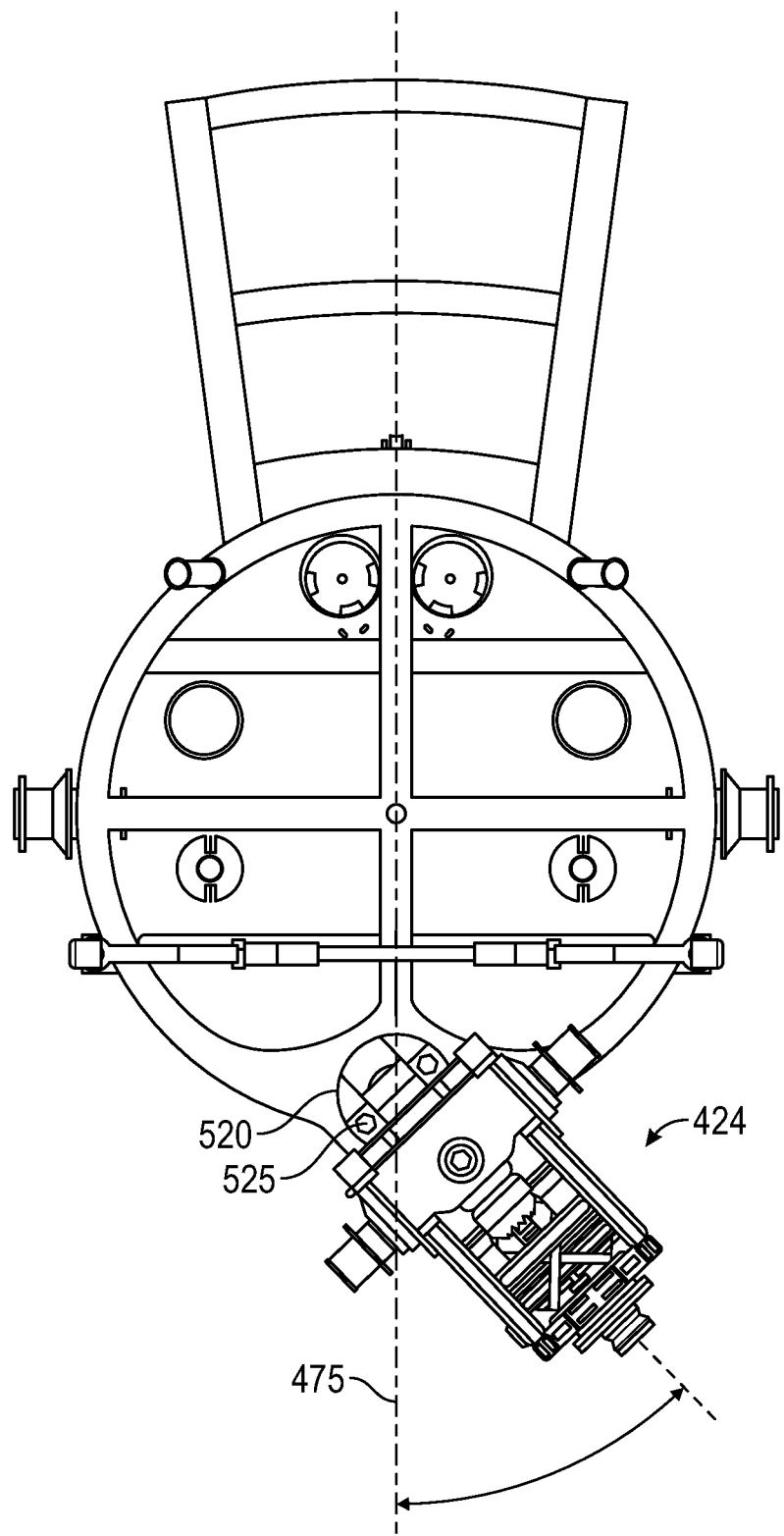
FIG. 5E shows the pipe module of FIG. 3 engaged with the heave stopper and with the post of FIG. 2.

FIG. 5D shows the post top end (420) has, in one embodiment, sixteen slots (530) spaced uniformly around the circumference of the post (410). In other embodiments, fewer than or more than sixteen slots may be spaced uniformly or unevenly around the circumference of the post. In other embodiments, the post top end may not include any slots (530). As shown, the slots (530) allow an equal number of angular locking increments of the rotatable head (520) about the post longitudinal axis (415) to provide compensation for foundation misalignment or to accommodate heading variations of a pipe module installation machine by rotation of the post top end (420). The slots (530) have a diameter, an arcuate length, and depth. The axis of each of the slots (530) may be parallel to the axis of the post longitudinal axis (415). The centerlines of each of the slots (530) are arranged on a slot center circle (535). The centerline of the slot center circle (535) may be coaxial with the post longitudinal axis (415). The slots (530) length extends around an arcuate portion of the slot center circle (535). The lock pin hole center circle (545) is coaxially located with and the same diameter as the slot center circle (535). The head rotation locking pin (525) may have any suitable shape, for example solid round stock, pipe, tube, square tube, solid square stock, and combinations thereof such that it may engage with the lock pin holes (540) and with the slots (530) having the same or similar shape. The slot arcuate length in combination with the head rotation locking pin (525) size allows the head rotation of +/−2.5° of rotation of the rotatable head (520) about the post longitudinal axis (415) from the locked position. The increments may be provided by a number of rotation-locking positions. Although post (410) is described and shown as having sixteen slots (530), one of ordinary skill in the art will appreciate that the slots (530) may be of any practical quantity and/or spacing without departing from the scope of embodiments disclosed herein. FIG. 5E shows in an embodiment where the rotatable head (520) is positioned at 45° (degrees) with respect to the foundation heading (475). The range of rotation of the rotatable head (520) may be any angular range such as 0 to 15° (degree), 0 to 30°, 30 to 90°, 90 to 180°, 0 to 360°, and combinations thereof. In the embodiment shown, the rotatable head range of rotation is 0 to 337.5° in 22.5° increments.

Figure 6A:
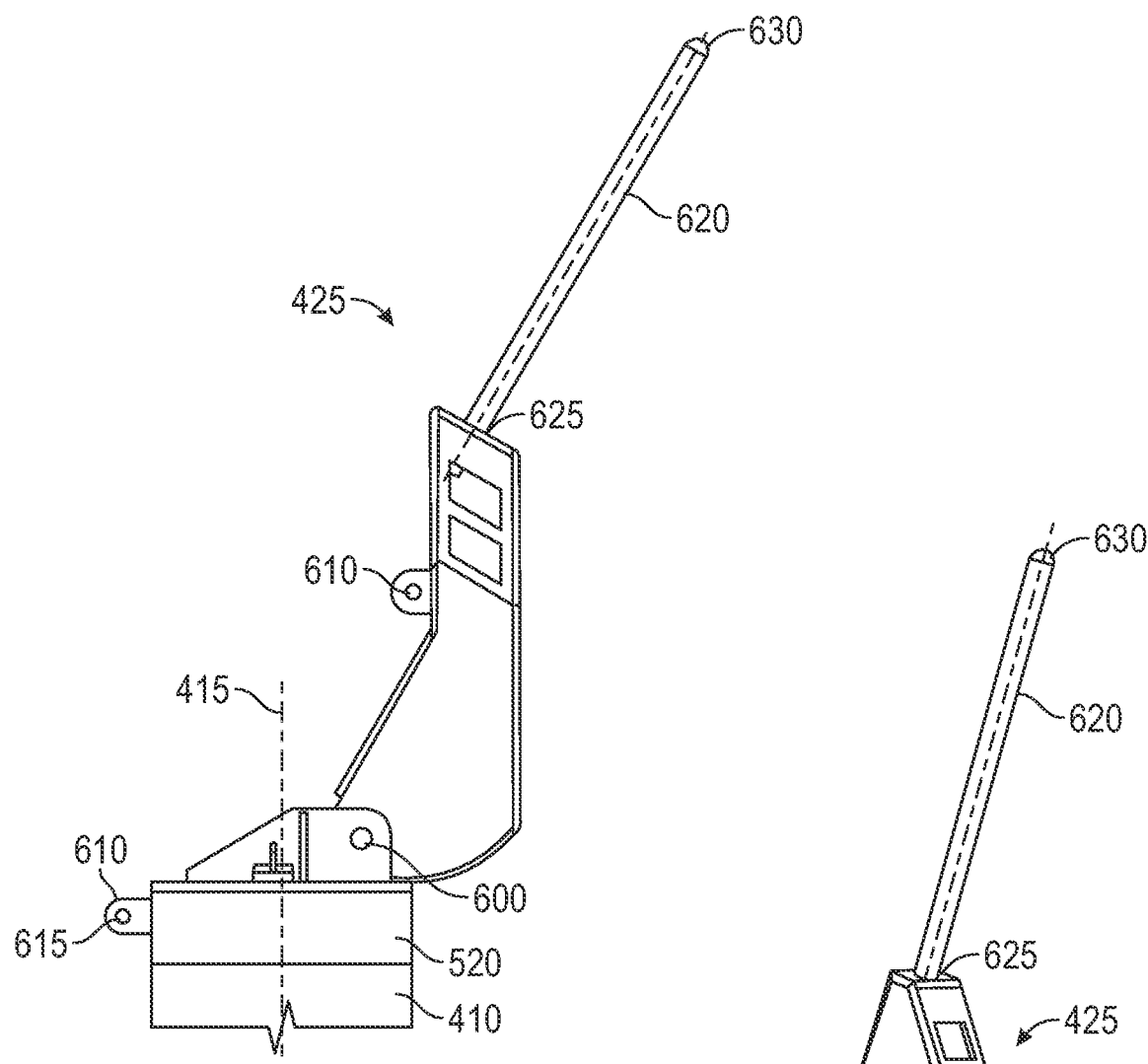
FIGS. 6A and 6B show a pivot feature of the heave stopper of FIGS. 5A-5E.
Figure 6B:
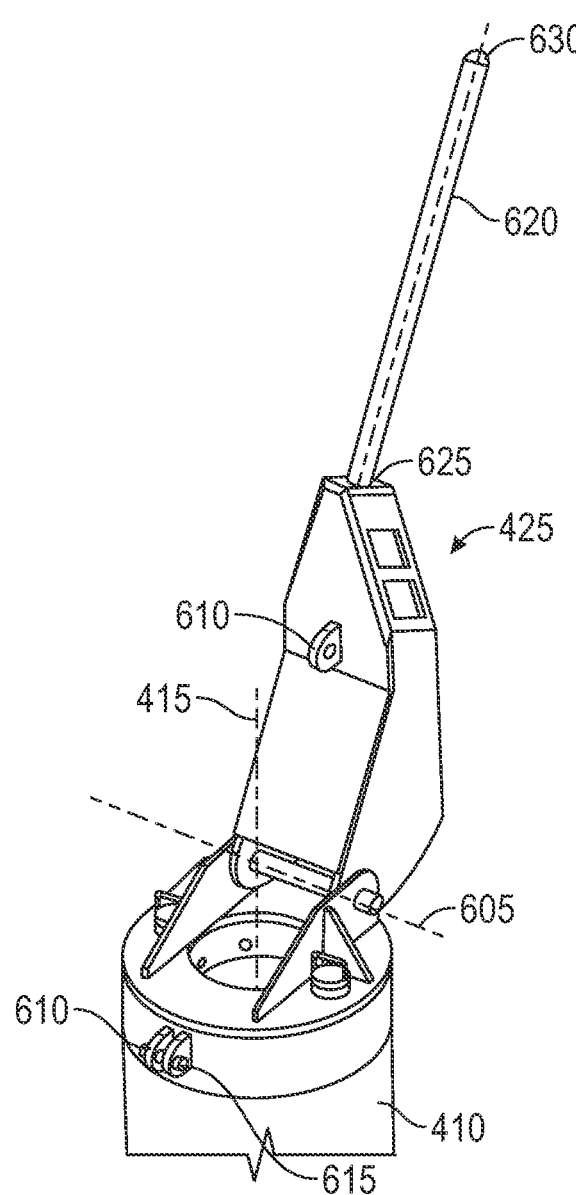
Figure 6C:
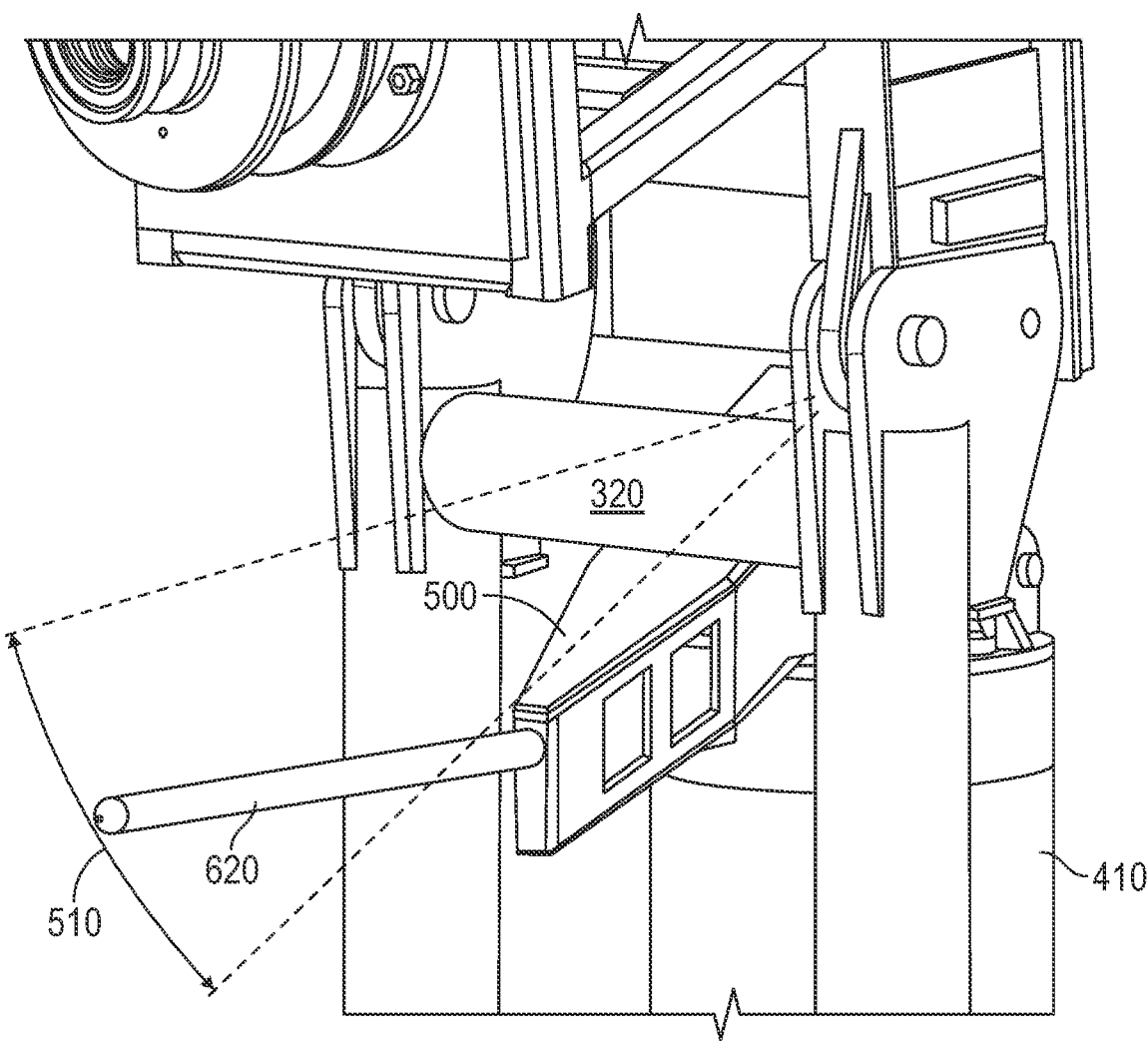
FIG. 6C shows the heave stopper of FIGS. 5A-5E engaged with the pipe module of FIG. 3 in accordance with embodiments disclosed herein.

FIGS. 6A-6C show the heave stopper (425) in accordance with one or more embodiments. The heave stopper (425) may include a hinged connection (600) to the rotatable head (520) wherein the heave stopper (425) may pivot about an axis such as a heave stopper axis (605). In the embodiment shown, the heave stopper axis (605) is perpendicular to the post longitudinal axis (415) of the post (410). In accordance with one or more embodiments, the range of pivot movement of the heave stopper (425) about the hinged connection (600) may be any angular range such as 0 to 15° (deg), 0 to 30°, 30 to 90°, 90 to 180°, 0 to 120°, 0 to 360°, and combinations thereof. In some embodiments, a minimum of 90° rotation of the heave stopper (425) is provided.

The heave stopper (425) may include a heave stopper locking mechanism (610) to lock the heave stopper (425) in a first position or closed position, in which the heave stopper (425) is positioned generally transverse to the post (410) and extends perpendicularly from a side surface of the post (410). The heave stopper locking mechanism (610) prevents or limits rotation of the heave stopper (425) about the heave stopper axis (605). The heave stopper locking mechanism (610) may include a lock such as a heave stopper pivot locking pin (615) selected to shear at a predetermined upheave impact force.

During normal operation, the heave stopper (425) is positioned in the closed position. Thus, movement of the yoke (300, FIG. 3) along the post (410) may be limited by the heave stopper (425) if the first transverse crossbeam (310 FIG. 3) contacts the heave stopper bottom end (505). However, under a large upheave motion, the first transverse crossbeam (310 FIG. 3) at the yoke first end (315 FIG. 3) may contact the heave stopper bottom end (505) of the heave stopper (425) resulting in an impact load. Upheave is a positive heave which is when the vessel such as a vessel on which the pipe module installation machine (150 FIG. 1) (to which the pipeline (140) is connected) is disposed moves upward with respect to the seabed. The predefined impact force capacity of the heave stopper locking mechanism (610) may be selected such that it corresponds to a specific upheave impact load, for example based on the material or geometry of the heave stopper pivot locking pin (615). Thus, when the upheave impact load is equal to or greater than the predetermined impact force of the heave stopper pivot locking pin (615), contact of the heave stopper bottom end (505) of the heave stopper (425) by the yoke (300) will cause the heave stopper pivot locking pin (615) to shear. Once the heave stopper pivot locking pin (615) shears, the upheave impact load and the contact between yoke (300) and the heave stopper bottom end (505) will cause the heave stopper (425) to rotate about hinged connection (600) into a second position or open position, in which the heave stopper (425) extends generally upwardly or parallel to the post longitudinal axis (415), as shown in FIG. 6A and FIG. 6B that does not inhibit the yoke from travel. Movement of the heave stopper (425) into the open position allows the yoke (300) to slide off from the post (410), thereby allowing the pipe module (205) to be released from the foundation (200). The release of the pipe module (205) from the foundation (200) is a disengagement feature.

FIG. 6C shows the second transverse crossbeam (320) contacting the heave stopper top end (500). Under vessel downward heave motion, if the pipe module (205) second transverse crossbeam (320) contacts the heave stopper top end (500), then the pipeline (140) could be in compression which could buckle the pipeline (140). Down heave is a negative heave which is when the vessel moves downward with respect to the seabed. The heave stopper top end angle (510) (for example, −30° (degrees below horizontal) as shown) may be selected to cause the second transverse crossbeam (320) to slide off of the heave stopper top end (500) to reduce a probability that the pipeline (140) will buckle. In this manner the pipe module (205) is released from the foundation (200). The release of the pipe module (205) from the foundation (200) is a disengagement feature. In accordance with one or more embodiments the heave stopper top end angle (510) may be any angle from horizontal within a range of 0° (horizontal) to −90° (vertical.)

Still referring to FIGS. 6A-6C, in one or more embodiments, the heave stopper (425) may further include a lateral guide rod (620) with a lateral guide rod first end (625) mounted on the heave stopper (425) and a lateral guide rod free end (630) not mounted to the heave stopper (425). The lateral guide rod free end (630) provides a visual indicator for aligning the yoke (300 FIG. 2) with the post (410 FIG. 2). The lateral guide rod (620) may be mounted on the heave stopper (425) such that the lateral guide rod (620) is perpendicular to the post longitudinal axis (415) when the heave stopper (425) is in the closed position. The lateral guide rod (620) may be formed from any suitable material such as fiberglass, plastic, carbon fiber composite, steel, aluminum, and any combinations thereof.

Figure 7D:
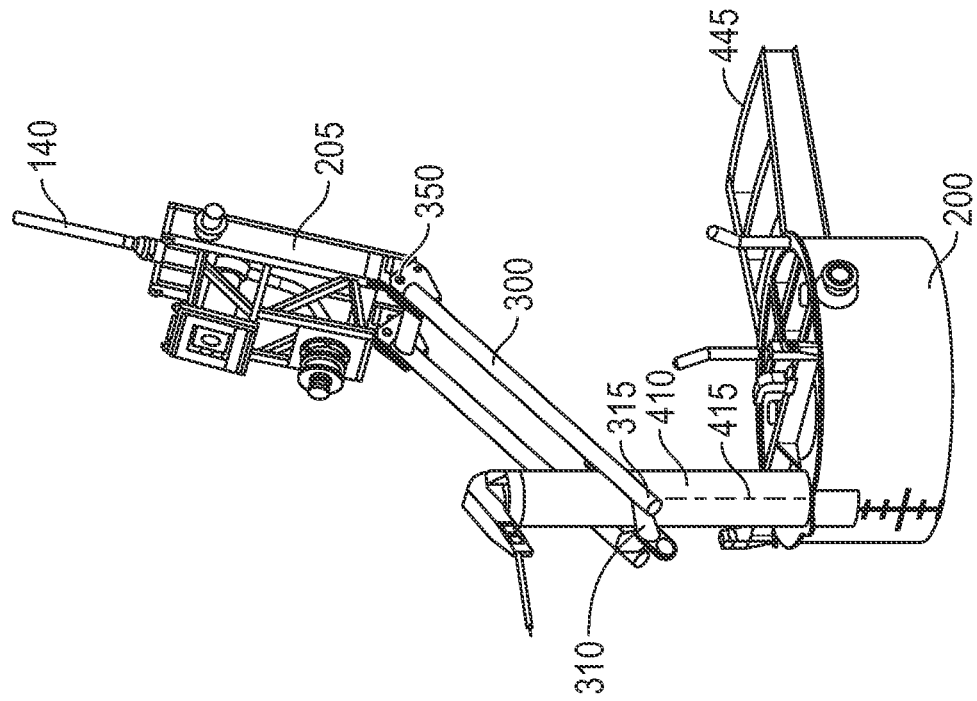
Figure 7C:
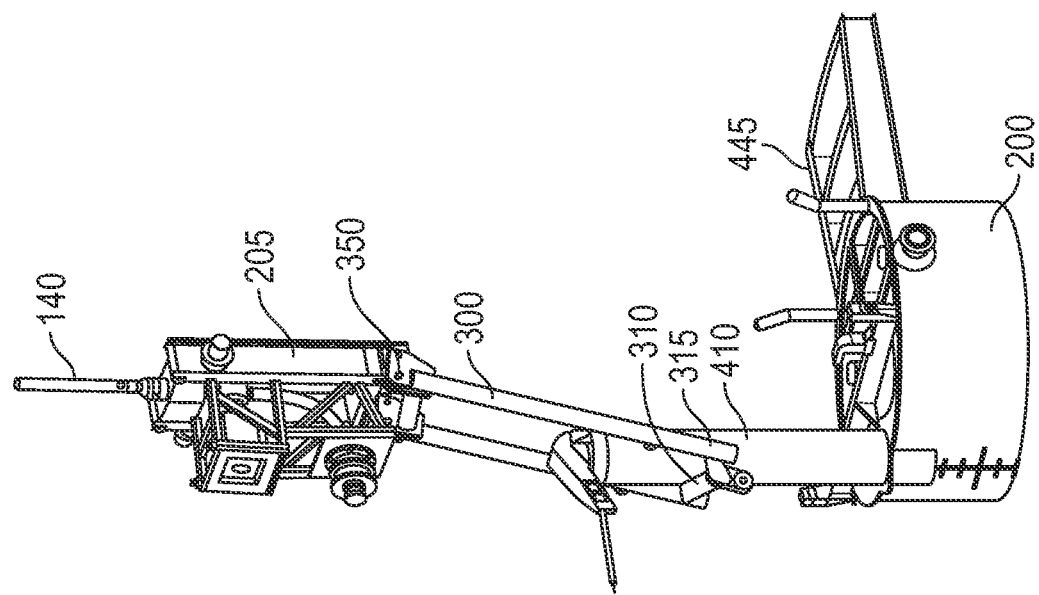

FIGS. 7A-7H show the pipe module (205) of FIG. 3 in position to engage the foundation (200) of FIG. 4 for securing the end portion of the pipeline segment of the pipeline (140) to initiate laying the pipeline (140). Specifically, FIGS. 7A-7D show a sequence of positions of the pipe module (205) and yoke (300) as the pipe module (205), connected to the pipeline (140), is lowered onto, and engages the foundation (200) to secure the pipe module (205) onto the foundation (200) and secure the end portion of the pipeline segment of the pipeline (140). In FIGS. 7A-7C, the pipe module installation machine (150) may be moved to move the pipe module (205) horizontally, thereby moving the yoke (300) over the heave stopper (425) and engaging the yoke (300) with the post (410), without paying out the pipeline (140). If the yoke (300) does not engage with the post (410) in a first attempt, the process may be easily repeated by moving the vessel back and again moving the pipe module (205) horizontally. This method may avoid the need to reel in a pipeline to properly engage the pipe module (205) with the foundation (200). FIG. 7A shows the foundation (200) having already been deployed via a foundation installation machine (150), and the pipe module (205) at the beginning of deployment. FIG. 7A also shows the pipe module (205) connected to the end portion of the pipeline (140) and suspended by the pipe module installation machine (150). The pipe module installation machine (150) begins deployment by lowering the pipe module (205) into the position shown by paying out the pipeline (140) from the pipe module installation machine (150). To pay out the pipeline means to let out the pipe gradually from the pipe module installation machine (150). The pipe module installation machine (150) deployment includes moving the pipe module (205) toward the post (410) into the position shown in FIG. 7A by moving the pipe module installation machine (150) toward the post longitudinal axis (415), without need to pay out the pipeline. FIG. 7A also shows the pipe module (205) comprising the yoke (300) wherein the yoke (300) has begun engagement with the post (410) of the foundation (200). FIG. 7A shows the pipe module (205) at a position where the yoke (300) surrounds the lateral guide rod (620) as the lateral guide rod (620) and heave stopper (425) are inserted into the yoke opening (330)

In the exemplary embodiment shown, the pipe module (205) is suspended by the end portion of the pipeline (140) and the pipeline (140) is suspended by an offshore pipeline installation machine (150). The pipeline installation machine (150) is subject to heave. The positions of the pipe module (205) and yoke (300) with respect to the foundation (200) are shown without vessel heave or a heave of zero. The alignment tolerance is thus a heave tolerance to accommodate movement of the pipeline installation vessel and is determined by the yoke opening length (340). The pipe module heave motion tolerance may vary depending on the application of the yoke-over PLET (135) and on the dimensions of, for example, the foundation (200), pipe module (205), pipeline (140), and yoke (300). In some embodiments, the pipe module heave motion tolerance may be approximately 1 m, 2 m, 3 m, 4 m, or more. In the exemplary embodiment shown, the pipe module heave motion tolerance is +/−2.3 m. The pipe module heave motion tolerance is provided by the allowed movement of the yoke along the post (410) of the foundation (200). For example, as shown in FIGS. 7A-7B, the first transverse crossbeam (310) of the yoke (300) contacts the heave stopper bottom end (505) at +2.3 m heave (2.3 m upheave.) The second transverse crossbeam contacts the top end of the heave stopper at −2.3 m heave (2.3 m down heave.) To enable the yoke (300) and the heave stopper (425) to engage, the yoke opening width (345) is greater than the heave stopper width (515). In the exemplary embodiment shown, the yoke opening width (345) is selected to provide engagement with the heave stopper (425) when the heave stopper rotatable head rotation is +/−20° from perpendicular to the pipe module bottom surface (365).

FIG. 7B continues the sequence of positions of the pipe module (205) and yoke (300) engaging the foundation at zero heave. FIG. 7B shows the yoke (300) cooperating with the post (410). The first transverse crossbeam (310) at the yoke first end (315) is shown cooperating with the post (410). The first transverse crossbeam (310) is shown contacting the post (410) as the yoke (300) is moved away from the post (410) in a horizontal direction generally perpendicular to the post axis (415) and opposite to the side of the post that is contacting the first transverse crossbeam (310). In this sequence the pipe module has crossed the post longitudinal axis (415). The pipe module installation machine (150) continues moving the pipe module (205) away from the post (410) into the position shown in FIG. 7B by moving the pipe module installation machine (150) away from the post longitudinal axis (415). The reaction of the yoke (300) against the post (410) causes the yoke (300) to rotate about the yoke hinge (350) and causes the yoke first end (315) to move up in elevation with respect to the foundation (200). The yoke (300) is shown rotated with respect to the pipe module (205) about the post longitudinal axis (415). In comparison to FIG. 7A, in FIG. 7B the pipe module (205) is shown moved further horizontally away from the post (410) in a horizontal direction generally perpendicular to the post axis (415) and opposite to the side of the post that is contacting the first transverse crossbeam (310). The yoke first end (315) is shown moved further up in elevation with respect to the foundation (200) along the post longitudinal axis (415).

FIG. 7C shows the yoke (300) further cooperating with the post (410). The first transverse crossbeam (310) at the yoke first end (315) is shown cooperating with the post (410). In comparison to FIG. 7B, in FIG. 7C the yoke (300) is shown further rotated with respect to the pipe module about the yoke hinge (350) as the pipe module (205) is further moved horizontally. In this sequence the pipe module installation machine (150) continues moving the pipe module (205) away from the post into the position shown by moving the pipe module installation machine (150) away from the post longitudinal axis (415). The pipe module (205) is shown moved further from the post (410) in a horizontal direction generally perpendicular to the post axis (415) and opposite to the side of the post that is contacting the first transverse crossbeam (310). The yoke first end (315) is shown moved further up in elevation with respect to the foundation (200) along the post longitudinal axis (415). Engagement of the yoke (300) with the post (410) as the pipe module (205) is moved helps align the pipe module (205) with the foundation (200).

FIG. 7D shows the yoke (300) further cooperating with the post (410). The first transverse crossbeam (310) at the yoke first end (315) is shown cooperating with the post (410) and, in comparison with FIG. 7C, is shown moved further up in elevation with respect to the foundation (200) along the post longitudinal axis (415). In this sequence the pipe module installation machine (150) continues moving the pipe module (205) away from the post into the position shown by moving the pipe module installation machine (150) away from the post longitudinal axis (415) and by paying out pipeline (140). As the yoke-over PLET is moving horizontally before the pipeline is paid out, the yoke of the yoke-over PLET may move up the post. The yoke (300) is shown further rotated with respect to the pipe module (205) about the yoke hinge (350). The pipe module (205) is shown moved further from the post (410) in a horizontal direction generally perpendicular to the post axis (415) and opposite to the side of the post that is contacting the first transverse crossbeam (310) and the pipe module (205) is shown lower in elevation with respect to the foundation (200). The pipeline (140) has been extended or lowered and therefore the pipe module is shown at a lower position with respect to the post (410). Additionally, due to this downward movement of the pipe module (205), and engagement of the yoke first end (315) with the post (410), the yoke (300) is rotated about the yoke hinge (350).

Figure 7E:
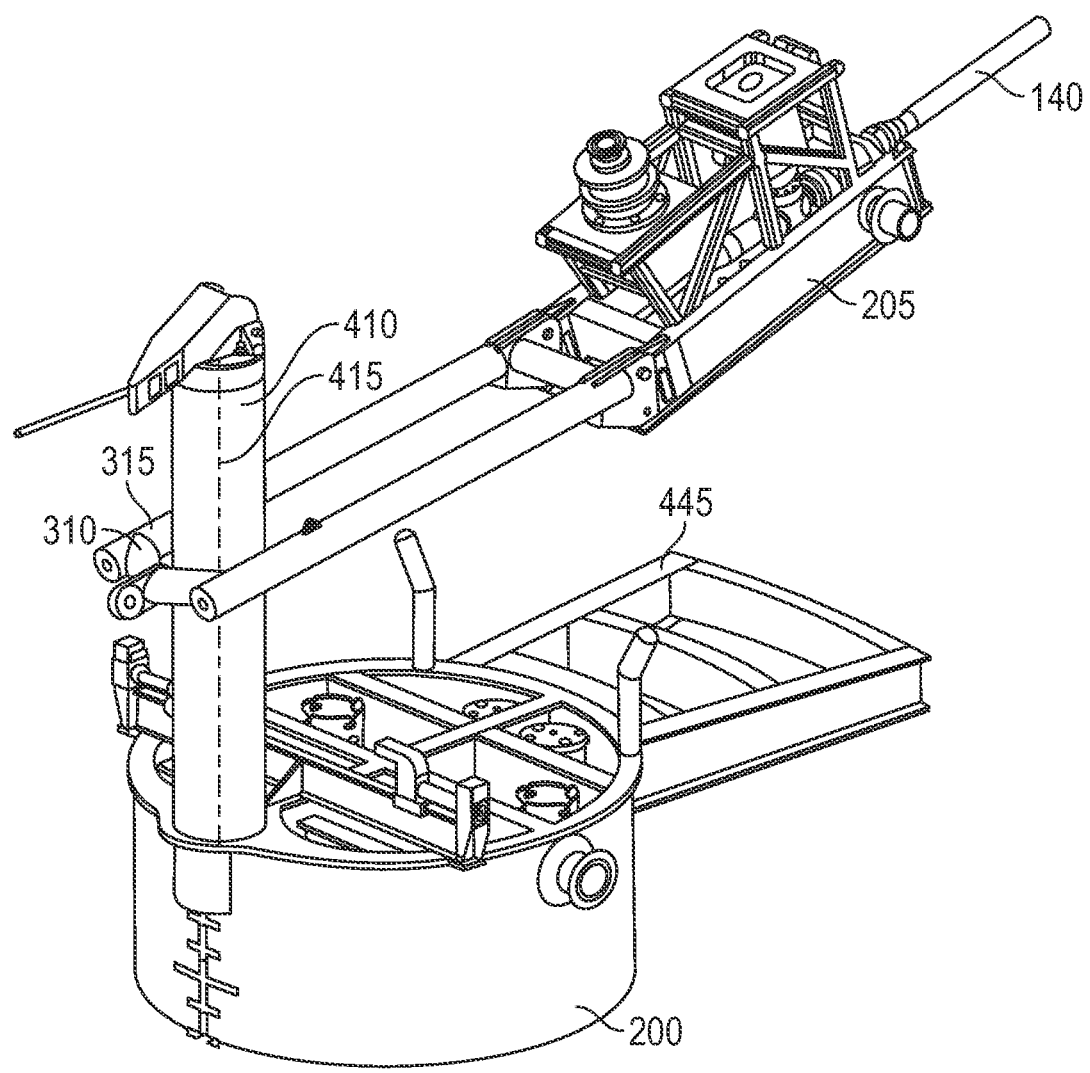

FIG. 7E shows the yoke (300) further cooperating with the post (410). The first transverse crossbeam (310) at the yoke first end (315) is shown cooperating with the post (410) and is shown moved to a middle elevation along the post longitudinal axis (415). In comparison with the degree of rotation of the yoke hinge (350) shown in FIG. 7D, the yoke (300) in FIG. 7E is shown less rotated with respect to the pipe module (205). The pipe module (205) is shown moved further from the post (410) in a horizontal direction generally perpendicular to the post axis (415) and opposite to the side of the post that is contacting the first transverse crossbeam (310) and the pipe module (205) is shown lower in elevation with respect to the foundation (200) than in FIG. 7D. FIG. 7E also shows a point in the sequence at which the pipe module installation machine (150) has full flexibility for selecting the pipe module (205) heading (470 FIG. 4C). At this point in the sequence, the pipe module (205) may fully rotate around the post (410).

Figure 7F:
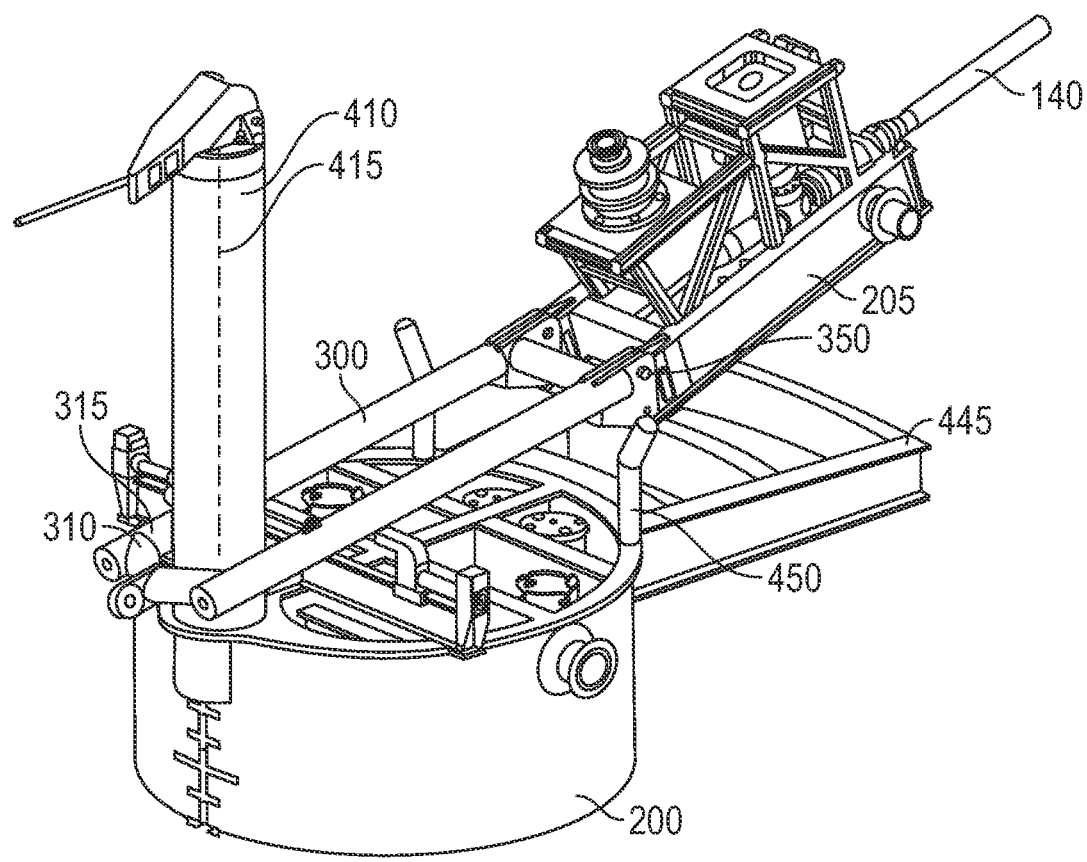

FIG. 7F shows the yoke (300) further cooperating with the post (410). The first transverse crossbeam (310) at the yoke first end (315) is shown cooperating with the post (410) and is shown moved to a low elevation along the post longitudinal axis (415). In comparison with the degree of rotation shown in FIG. 7E, the yoke (300) in FIG. 7F is shown less rotated about the yoke hinge (350) with respect to the pipe module (205). The pipe module (205) is shown moved further horizontally from the post (410) toward the extension (445) and the pipe module (205) is shown lower in elevation with respect to the foundation (200) than in FIG. 7E. The landing guide (450) helps guide and position the pipe module (205) on the foundation (200). The yoke (300) may engage with the landing guide (450) so that the pipe module (205) may be guided into position on the foundation (200) as the yoke (300) engages with the post (410) of the foundation (200).

Figure 7G:
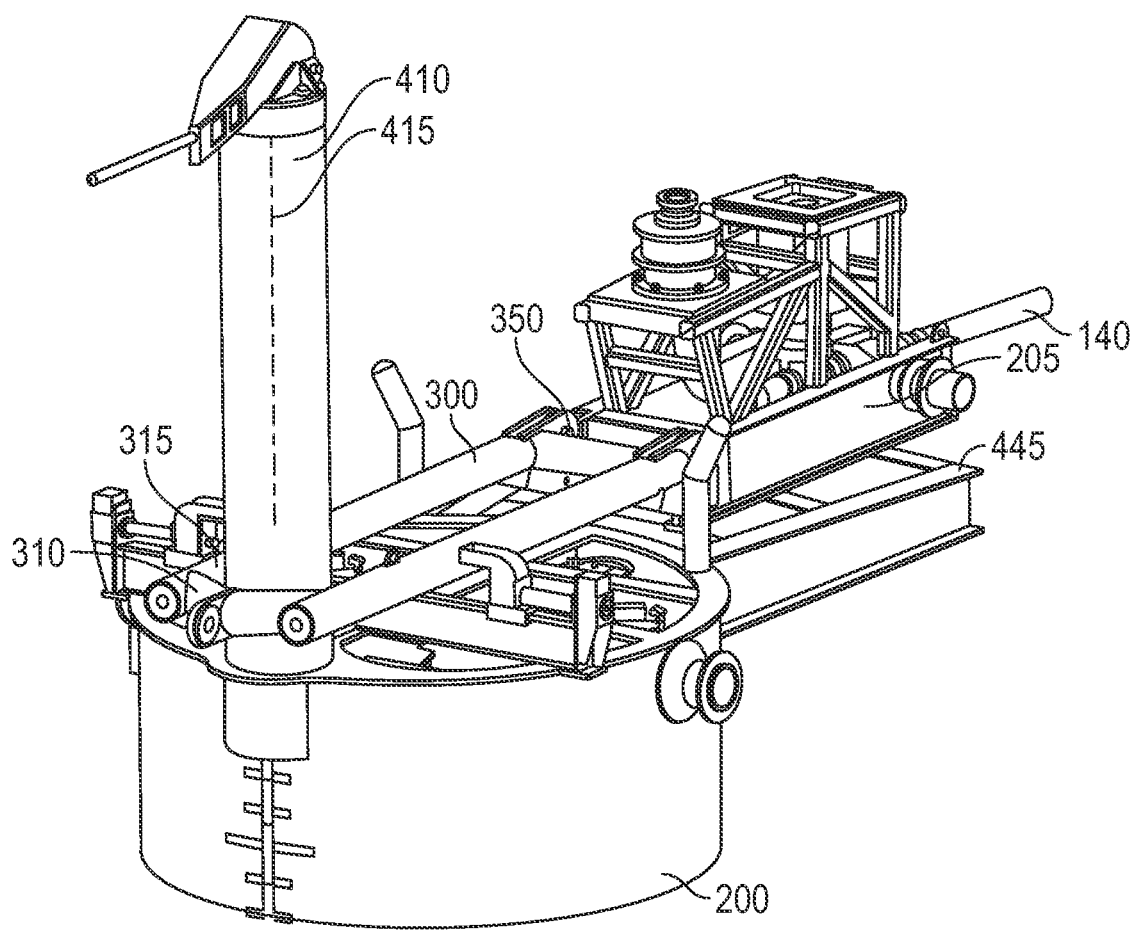

FIG. 7G shows the yoke (300) further cooperating with the post (410). The first transverse crossbeam (310) at the yoke first end (315) is shown cooperating with the post (410) and is shown moved to a low elevation along the post longitudinal axis (415). In comparison with the degree of rotation shown in FIG. 7F, the yoke (300) in FIG. 7G is shown less rotated about the yoke hinge (350) with respect to the pipe module (205). The pipe module (205) is shown moved further horizontally from the post (410) toward the extension (445) and the pipe module (205) is shown lower in elevation with respect to the foundation (200) than in FIG. 7F.

Figure 7H:
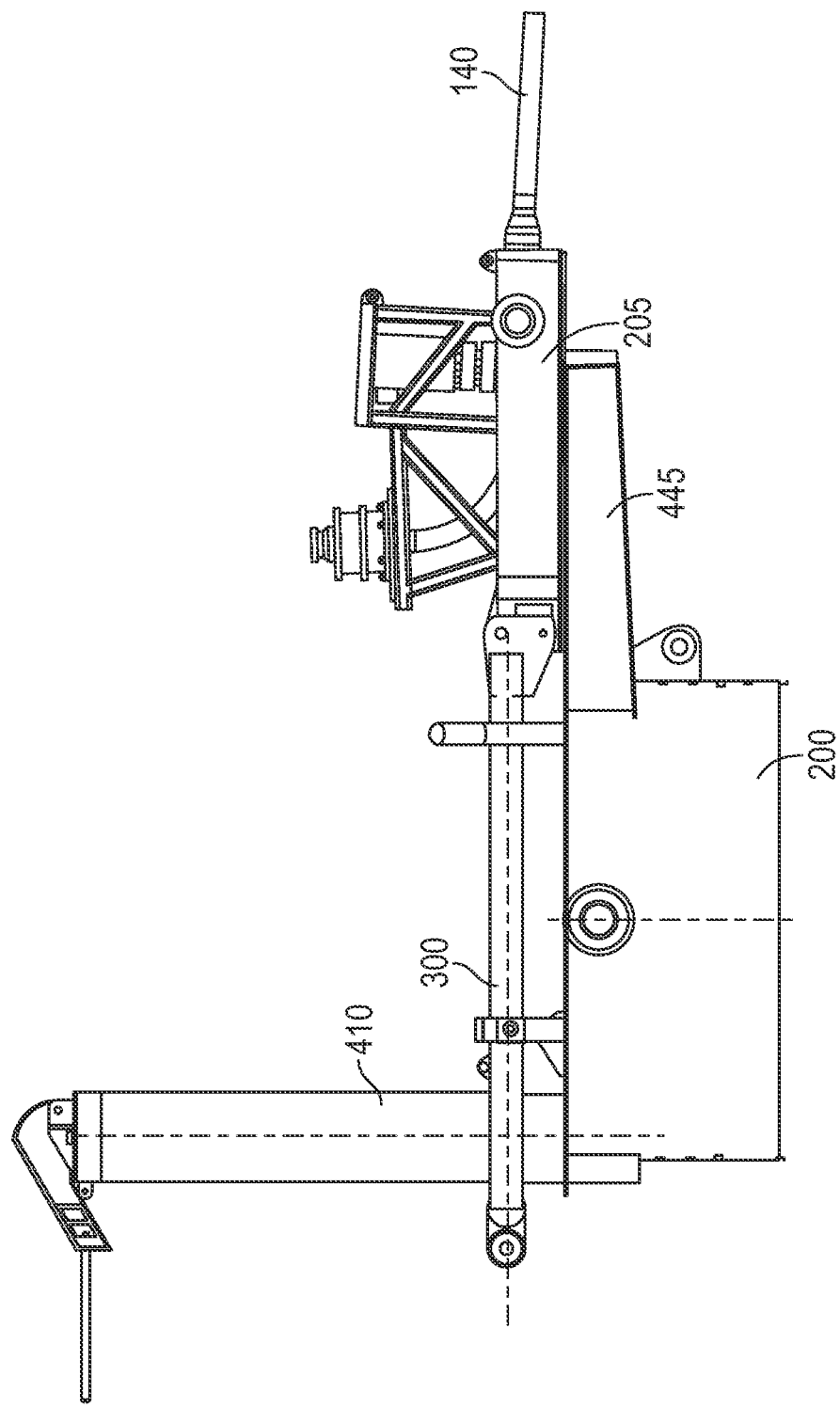

FIG. 7H shows the yoke (300) engaged with the post (410). The yoke (300) is shown horizontal with respect to the pipe module (205). The pipe module (205) is shown engaged with the extension (445) of foundation (200). In other words, in FIG. 7H, pipe module (205) is landed on the extension (445) of the foundation (200) and properly positioned on the foundation (200) due to engagement of the yoke (300) with the post (410) and the landing guideposts (455) about the yoke (300).

FIGS. 8A and 8B show the yoke support (430) of the system for securing the end portion of the pipeline segment of the pipeline (140) of FIG. 2 in accordance with embodiments disclosed herein. FIGS. 8A and 8B show the yoke (300) engaged with the post (410) and engaged with the yoke support (430). The yoke (300) is shown engaged with the lateral restraint (440) and with the uplift restraint (435). The yoke second end (325) is shown engaged with the pipe module longitudinal stop (370). Refer to the description of FIG. 4A for more detail of the lateral restraint (440) and the uplift restraint (435).

Figure 9:
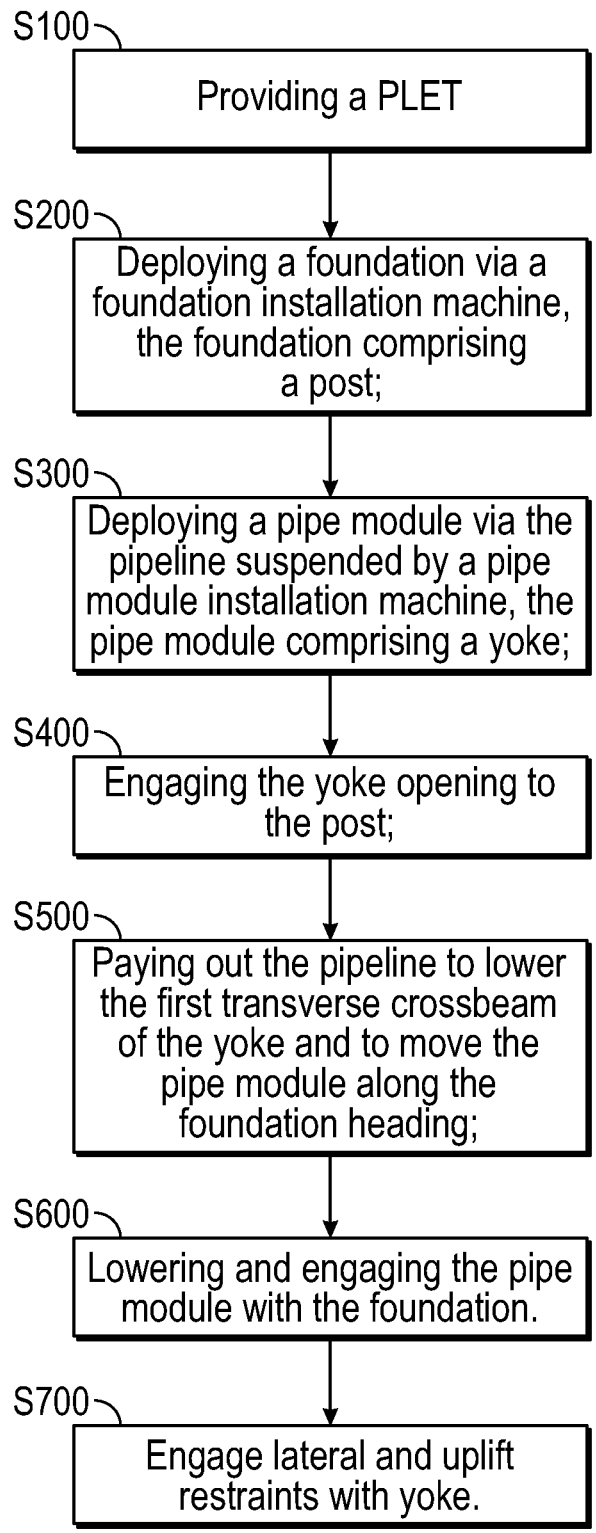
FIG. 9 shows a flowchart in accordance with embodiments of the present disclosure.

FIG. 9 depicts a flowchart in accordance with one or more embodiments. More specifically, FIG. 9 illustrates a method for securing an end portion of a pipeline segment of a pipeline (140). Further, one or more steps in FIG. 9 may be performed by one or more components as described in FIGS. 1-8 (e.g., the yoke-over PLET (135)). While the various steps in FIG. 9 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

Referring to FIGS. 7A-7H and 9 together, initially, the yoke-over PLET (135) is provided (S100). The yoke-over PLET (135) is deployed first by deploying a foundation (200) with a post (410) via a foundation installation machine (150) (S200). The pipe module (205) having a yoke (300) is deployed next using a pipeline (140) suspended by the pipe module installation machine (150) (S300). In accordance with one or more embodiments the pipe module installation machine (150) pays out the pipeline to lower the pipe module (205) having a yoke (300) to align the approximate center of the yoke opening (330) with the lateral guide rod free end (630) and the heave stopper (425). The pipe module installation machine (150) moves the pipe module (205) and yoke (300) toward the post (410) until the first transverse crossbeam (310) of the yoke (300) contacts the post (410).

The pipe module installation machine (150) moves the pipe module (205) having a yoke (300) along the foundation heading (475) toward the extension (445). The contact of the first transverse crossbeam (310) against the post (410) prevents the yoke first end (315) from moving along the foundation heading (475) and causes the yoke (300) to rotate about the yoke hinge (350) as the pipe module (205) moves along the foundation heading (475). In this manner the pipe module installation machine (150) engages the yoke opening (330) to the post (410) of the foundation (200) (S400). The pipe module installation machine (150) pays out the pipeline (140) to lower the pipe module (205) and the yoke (300) and the pipe module installation machine moves the pipe module (205) horizontally along the foundation heading (475) (S500). The pipe module installation machine (150) lowers the pipe module (205) further and the pipe module (205) engages with the foundation (200) (S600) as the engagement of the yoke (300) with the post (410) guides the pipe module (205) into proper positioning on the foundation (200).

In accordance with one or more embodiments engaging the pipe module (205) with the foundation (200) includes engaging a lateral restraint (440) and an uplift restraint (435) with the yoke (S700). The lateral restraint (440) and the uplift restraint (435) may be adjusted by use of the ROV. For example, the adjustment could be a screw tightened by the ROV to move the lateral restraint (440) and the uplift restraint (435) along the yoke support (430) until the lateral restraint contacts the one of the two longitudinal members (305) adjacent to the lateral restraint (440) to arrive at a lateral restraint locked position. The uplift restraint (435) is connected to the lateral restraint (440) such that when the lateral restraint (440) arrives at the lateral restraint locked position, the uplift restraint (435) will cover the top of the one of the two longitudinal members (305) adjacent to the lateral restraint (440) to secure the yoke (300).

The method for securing the end portion of the pipeline segment of the pipeline (140) may also include rotating a rotatable head (520) of a heave stopper (425) to orient the heave stopper (425) while it is installed subsea in a direction of a pipeline initiation. The rotating a rotatable head (520) of the heave stopper (425) may include disengaging a locking pin (525) from a groove, hole, or slot (530), rotating the rotatable head (520) with an ROV, and engaging the locking pin (525) in a second groove, hole, or slot (530), the groove, hole, or slot (530) corresponding to an angular position of the rotatable head (520).

The method for securing the end portion of the pipeline segment of the pipeline (140) may also include pivoting a heave stopper (425) with respect to a heave stopper axis (605) to move the heave stopper (425) from a closed position to an open position in the event of an impact load in an upward direction. Specifically, in the event of an upheave, the method may include contacting the heave stopper bottom end (505) with the first transverse crossbeam (310) of the yoke (300) with sufficient force to shear the locking mechanism (610) of the heave stopper (425) and move the heave stopper (425) from the closed position to the open position.

Embodiments of the present disclosure may provide at least one of the following advantages. Embodiments disclosed herein may provide a visual indication of alignment of the yoke with the post to ensure proper position of the pipe module (205) with respect to the foundation (200). Further, embodiments disclosed herein may allow for disengagement of the pipe module (205) from the foundation in response to unplanned heave-induced impact load caused by the first transverse crossbeam (310) contacting the heave stopper bottom end (505) in upheave motion or contacting the heave stopper bottom end (500) in down heave motion, thereby limiting or preventing damage to subsea equipment during upheaves or buckling of the pipeline (140) during down heaves. This disengagement feature reduces the risk of damage during installation in an offshore environment that has more heave than the heave motion tolerance requirements of other PLET systems. Advantageously, the pipeline initiation heading of the yoke-over PLET system disclosed herein is a full 360° about the post longitudinal axis (415). Additionally, the yoke-over PLET system disclosed herein allows for adjustment and accommodation of different heave constraints based on given field parameters. The yoke-over PLET overall structure may be lighter and simpler than other PLET systems. In some embodiments, the yoke-over PLET system uses a suction pile for which installation and handling may be simplified compared with other PLET systems.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A system for securing an end portion of a pipeline segment of a pipeline, comprising:
   a foundation having a foundation top surface and a foundation bottom surface, and a post mounted on the foundation top surface;
   a pipe module configured to couple to the foundation, the pipe module having a bottom surface and a pipe module longitudinal stop;
   a yoke mounted to the pipe module, the yoke cooperating with the post to engage the pipe module with the foundation;
   a heave stopper assembly mounted to the post and configured to provide a stop to limit movement of the yoke axially along the post wherein the heave stopper assembly comprises a heave stopper extending radially from the post, wherein the heave stopper is rotatable about an axis perpendicular to a post longitudinal axis; and
   an extension mounted to the foundation and extending radially from the foundation, the pipe module being connected to the end portion of the pipeline segment of the pipeline and configured to slide along the extension responsive to longitudinal and angular movements of the pipeline segment of the pipeline.

2. The system of claim 1, wherein the foundation comprises a suction pile.

3. The system according to claim 1, wherein the yoke is connected to an end of the pipe module and the pipe module is configured to pivot about the post to engage an upper portion of the foundation.

4. The system according to claim 1, wherein the yoke comprises two longitudinal members, a first transverse crossbeam connected between the two longitudinal members at a first end, and a second transverse crossbeam connected between the two longitudinal members at a second end, the two longitudinal members, the first transverse crossbeam, and the second transverse crossbeam defining a yoke opening, the yoke opening configured to receive the post.

5. The system according to claim 4, wherein each of the two longitudinal members is hingedly connected to the pipe module with a yoke hinge.

6. The system according to claim 5, wherein the yoke hinge comprises a yoke locking mechanism comprising a yoke rotation locking pin.

7. The system according to claim 1, wherein the heave stopper is hingedly connected to a top surface of the post with a heave stopper hinged connection.

8. The system according to claim 7, wherein the heave stopper comprises a heave stopper locking mechanism.

9. The system according to claim 8, wherein the heave stopper hinge comprises a pivot pin and the heave stopper locking mechanism comprises a heave stopper pivot locking pin to lock the heave stopper rotation.

10. The system according to claim 7, wherein the heave stopper assembly comprises a rotatable head rotatably connected to the top surface of the post and rotatable about the post longitudinal axis.

11. The system according to claim 10, wherein the rotatable head comprises a rotatable head locking mechanism to lock the rotatable head rotation.

12. The system according to claim 1, wherein the heave stopper assembly comprises a lateral guide rod mounted on the heave stopper.

13. The system according to claim 1, comprising a yoke support mounted on the foundation top surface and configured to restrict yoke lateral movement and yoke upward movement.

14. A method for securing an end portion of a pipeline segment of a pipeline, the method comprising:
   deploying a foundation subsea and securing the foundation to a seafloor, the foundation comprising a post;
   deploying a pipe module via the pipeline suspended by a pipe module installation machine, the pipe module comprising a yoke;
   engaging the yoke with the post;
   paying out the pipeline to lower a first transverse crossbeam of the yoke;
   wherein the paying out the pipeline to lower the first transverse crossbeam of the yoke comprises pivoting the pipe module about the post and along a longitudinal axis of the post; and
   lowering and engaging the pipe module with the foundation.

15. The method of claim 14, wherein engaging the yoke with the post comprises aligning an approximate center of a yoke opening with a lateral guide rod free end by rotating a rotatable head.

16. The method of claim 14, wherein engaging the pipe module with the foundation comprises engaging the yoke with a lateral restraint and an uplift restraint.

17. The method of claim 14, wherein the engaging the yoke with the post comprises moving the pipe module horizontally.

* * * * *